United States Patent
Gordon et al.

(10) Patent No.: US 8,032,906 B2
(45) Date of Patent: Oct. 4, 2011

(54) METHOD AND SYSTEM FOR PROVIDING A PROGRAM GUIDE AND MULTIPLE VIDEO STREAMS USING SLICE-BASED ENCODING

(75) Inventors: Donald F. Gordon, Los Altos, CA (US); Sadik Bayrakeri, Foster City, CA (US); Edward A. Ludvig, Redwood City, CA (US); Eugene Gershtein, Redwood Shores, CA (US); Jeremy S. Edmonds, Castro Valley, CA (US); John P. Comito, Redwood City, CA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 1409 days.

(21) Appl. No.: 10/265,752

(22) Filed: Oct. 7, 2002

(65) Prior Publication Data

US 2003/0028879 A1 Feb. 6, 2003

Related U.S. Application Data

(63) Continuation of application No. 09/454,216, filed on Dec. 9, 1999, now Pat. No. 6,481,012, which is a continuation-in-part of application No. 09/428,066, filed on Oct. 27, 1999, now Pat. No. 6,651,252.

(51) Int. Cl.
*H04N 5/455* (2006.01)
*H04N 11/02* (2006.01)

(52) U.S. Cl. .......... 725/39; 725/41; 375/240.25

(58) Field of Classification Search .......... 725/39, 725/40, 43, 44, 54, 114, 131, 138, 139, 144, 725/151, 37, 38, 41, 116; 375/240, 240.01, 375/240.25, 240.26

See application file for complete search history.

(56) References Cited

U.S. PATENT DOCUMENTS 4,250,521 A 2/1981 Wright
(Continued)

FOREIGN PATENT DOCUMENTS

EP 0 725 539 A2 * 7/1996
(Continued)

OTHER PUBLICATIONS

Partial European Search Report for EP07016891 dated Jul. 5, 2010.
(Continued)

*Primary Examiner* — Andrew Koenig
*Assistant Examiner* — Jason M Thomas
(74) *Attorney, Agent, or Firm* — Banner & Witcoff, Ltd.

(57) ABSTRACT

Methods for slice-based encoding of program guides and user interfaces are disclosed. The program guides include multiple video streams for picture-in-picture and other applications. A method for encoding the program guide includes encoding a first set of slices for each of a plurality of graphics pages; and encoding a second set of slices for each of a plurality of video streams.

The user interfaces are multi-functional and may be used for electronic commerce and other applications. A method of generating the user interface includes encoding a set of slices for each of a plurality of objects, each object being characterized by an identity, at least one attribute, and at least one operation. In one embodiment of this method, the plurality of objects include an electronic commerce object, where the electronic commerce object is attributed with a first hyper text markup language (HTML) page.

18 Claims, 32 Drawing Sheets

U.S. PATENT DOCUMENTS

| | | | |
|---|---|---|---|
| 4,290,063 A | 9/1981 | Traster | 340/723 |
| 4,437,093 A | 3/1984 | Bradley | 340/726 |
| 4,479,142 A | 10/1984 | Buschman et al. | |
| 4,496,976 A | 1/1985 | Swanson et al. | 358/147 |
| 4,520,356 A | 5/1985 | O'Keefe et al. | 340/750 |
| RE32,187 E | 6/1986 | Barda et al. | 340/706 |
| 4,600,921 A | 7/1986 | Thomas | 340/825.31 |
| 4,633,297 A | 12/1986 | Skerlos et al. | 358/22 |
| 4,706,121 A | 11/1987 | Young | 358/142 |
| 4,706,121 A | 11/1987 | Young | 358/142 |
| 4,712,239 A | 12/1987 | Frezza et al. | 380/20 |
| 4,734,764 A | 3/1988 | Pocock et al. | 358/86 |
| 4,739,318 A | 4/1988 | Cohen | 340/750 |
| 4,742,344 A | 5/1988 | Nakagawa et al. | 340/723 |
| 4,745,468 A | 5/1988 | Von Kohorn | 358/84 |
| 4,751,578 A | 6/1988 | Reiter et al. | 358/183 |
| 4,792,848 A | 12/1988 | Nussrallah et al. | 358/86 |
| 4,792,849 A | 12/1988 | McCalley et al. | 358/86 |
| 4,829,372 A | 5/1989 | McCalley et al. | 358/86 |
| 4,829,569 A | 5/1989 | Seth-Smith et al. | 380/10 |
| 4,847,825 A | 7/1989 | Levine | 369/47 |
| 4,860,123 A | 8/1989 | McCalley et al. | 358/342 |
| 4,866,770 A | 9/1989 | Seth-Smith et al. | 380/20 |
| 4,876,592 A | 10/1989 | Von Kohorn | 358/84 |
| 4,884,267 A | 11/1989 | Miyamoto et al. | |
| 4,885,775 A | 12/1989 | Lucas | 380/10 |
| 4,890,321 A | 12/1989 | Seth-Smith et al. | 380/20 |
| 4,905,094 A | 2/1990 | Pocock et al. | 358/342 |
| 4,908,713 A | 3/1990 | Levine | 358/335 |
| 4,926,255 A | 5/1990 | Von Kohorn | 358/84 |
| 4,941,040 A | 7/1990 | Pocock et al. | 358/86 |
| 4,963,994 A | 10/1990 | Levine | 358/335 |
| 4,977,455 A | 12/1990 | Young | 358/142 |
| 4,991,011 A | 2/1991 | Johnson et al. | 358/141 |
| 4,994,908 A | 2/1991 | Kuban et al. | 358/86 |
| 5,014,125 A | 5/1991 | Pocock et al. | 358/86 |
| 5,027,400 A | 6/1991 | Baji et al. | |
| 5,034,807 A | 7/1991 | Von Kohorn | 358/84 |
| 5,038,211 A | 8/1991 | Hallenbeck | 358/142 |
| 5,057,915 A | 10/1991 | Von Kohorn | 358/84 |
| 5,058,160 A | 10/1991 | Banker et al. | 380/20 |
| 5,109,279 A | 4/1992 | Ando | 358/147 |
| 5,113,496 A | 5/1992 | McCalley et al. | 395/200 |
| 5,119,188 A | 6/1992 | McCalley et al. | 358/86 |
| 5,123,046 A | 6/1992 | Levine | 380/10 |
| 5,128,752 A | 7/1992 | Von Kohorn | 358/84 |
| 5,146,210 A | 9/1992 | Heberle | 340/709 |
| 5,151,789 A | 9/1992 | Young | 358/194.1 |
| 5,191,410 A | 3/1993 | McCalley et al. | 358/86 |
| 5,195,092 A | 3/1993 | Wilson et al. | 370/94.2 |
| 5,208,665 A | 5/1993 | McCalley et al. | 358/86 |
| 5,227,874 A | 7/1993 | Von Kohorn | 358/84 |
| 5,231,665 A | 7/1993 | Auld et al. | 380/20 |
| 5,239,540 A | 8/1993 | Rovira et al. | 370/77 |
| 5,247,364 A | 9/1993 | Banker et al. | 358/191.1 |
| 5,249,044 A | 9/1993 | Von Kohorn | 358/86 |
| 5,260,778 A | 11/1993 | Kauffman et al. | 358/86 |
| 5,270,809 A | 12/1993 | Gammie et al. | 358/84 |
| 5,283,734 A | 2/1994 | Von Kohorn | 364/412 |
| 5,293,357 A | 3/1994 | Hallenbeck | 348/734 |
| 5,297,204 A | 3/1994 | Levine | 380/10 |
| 5,301,028 A | 4/1994 | Banker et al. | 348/570 |
| 5,303,295 A | 4/1994 | West et al. | 380/10 |
| 5,307,173 A | 4/1994 | Yuen et al. | 358/335 |
| 5,319,454 A | 6/1994 | Schutte | 348/5.5 |
| 5,319,707 A | 6/1994 | Wasilewski et al. | 380/14 |
| 5,335,079 A | 8/1994 | Yuen et al. | 358/335 |
| 5,353,121 A | 10/1994 | Young et al. | 348/563 |
| 5,365,282 A | 11/1994 | Levine | 348/734 |
| 5,373,330 A | 12/1994 | Levine | 348/734 |
| 5,382,983 A | 1/1995 | Kwoh et al. | 348/716 |
| 5,400,401 A | 3/1995 | Wasilewski et al. | 380/9 |
| 5,406,558 A | 4/1995 | Rovira et al. | 370/77 |
| 5,414,448 A | 5/1995 | Wada et al. | 345/194 |
| 5,414,756 A | 5/1995 | Levine | 379/67 |
| 5,420,647 A | 5/1995 | Levine | 348/734 |
| 5,422,674 A | 6/1995 | Hooper et al. | 348/409 |
| 5,428,404 A | 6/1995 | Ingram et al. | 348/726 |
| 5,438,370 A | 8/1995 | Primiano et al. | 348/476 |
| 5,440,632 A | 8/1995 | Bacon et al. | 380/20 |
| 5,473,609 A | 12/1995 | Chaney | 370/94.1 |
| 5,473,704 A | 12/1995 | Abe | 382/235 |
| 5,475,382 A | 12/1995 | Yuen et al. | 340/825.72 |
| 5,477,262 A | 12/1995 | Banker et al. | 348/7 |
| 5,479,266 A | 12/1995 | Young et al. | 358/335 |
| 5,479,268 A | 12/1995 | Young et al. | 358/335 |
| 5,485,221 A | 1/1996 | Banker et al. | 348/563 |
| 5,488,409 A | 1/1996 | Yuen et al. | 348/5 |
| 5,493,339 A | 2/1996 | Birch et al. | 348/461 |
| 5,502,504 A | 3/1996 | Marshall et al. | 348/565 |
| 5,508,815 A | 4/1996 | Levine | 358/335 |
| 5,515,173 A | 5/1996 | Mankovitz et al. | 358/335 |
| 5,523,794 A | 6/1996 | Mankovitz et al. | 348/460 |
| 5,523,796 A | 6/1996 | Marshall et al. | 348/589 |
| 5,532,732 A | 7/1996 | Yuen et al. | 348/1 |
| 5,532,754 A | 7/1996 | Young et al. | 348/569 |
| 5,539,391 A | 7/1996 | Yuen | 340/825.72 |
| 5,539,822 A | 7/1996 | Lett | 380/20 |
| 5,543,852 A | 8/1996 | Yuen et al. | 348/478 |
| 5,543,853 A | 8/1996 | Haskell et al. | |
| 5,550,576 A | 8/1996 | Klosterman | 348/6 |
| 5,550,863 A | 8/1996 | Yurt et al. | |
| 5,552,837 A | 9/1996 | Mankovitz | 348/734 |
| 5,553,123 A | 9/1996 | Chan et al. | 379/102 |
| 5,559,550 A | 9/1996 | Mankovitz | 348/6 |
| 5,559,870 A | 9/1996 | Patton et al. | 379/107 |
| 5,568,272 A | 10/1996 | Levine | 386/48 |
| 5,579,055 A | 11/1996 | Hamilton et al. | 348/476 |
| 5,579,057 A | 11/1996 | Banker et al. | 348/589 |
| 5,581,614 A | 12/1996 | Ng et al. | 380/20 |
| 5,585,865 A | 12/1996 | Amano et al. | |
| 5,592,551 A | 1/1997 | Lett et al. | 380/20 |
| 5,598,415 A | 1/1997 | Nuber et al. | |
| 5,600,378 A | 2/1997 | Wasilewski et al. | 348/468 |
| 5,600,711 A | 2/1997 | Yuen | 379/102 |
| 5,604,528 A | 2/1997 | Edwards et al. | 348/5.5 |
| 5,619,247 A | 4/1997 | Russo | 348/3 |
| 5,619,269 A | 4/1997 | Lee et al. | |
| 5,619,274 A | 4/1997 | Roop et al. | 348/461 |
| 5,619,337 A | 4/1997 | Naimpally | |
| 5,619,383 A | 4/1997 | Ngai | 360/20 |
| 5,621,579 A | 4/1997 | Yuen | 386/121 |
| 5,623,308 A | 4/1997 | Civanlar et al. | |
| 5,625,406 A | 4/1997 | Newberry et al. | |
| 5,630,119 A | 5/1997 | Aristides et al. | 395/601 |
| 5,633,683 A * | 5/1997 | Rosengren et al. | 375/240.01 |
| 5,635,978 A * | 6/1997 | Alten et al. | 725/42 |
| 5,644,354 A | 7/1997 | Thompson et al. | 348/13 |
| 5,659,350 A | 8/1997 | Hendricks et al. | |
| 5,659,367 A | 8/1997 | Yuen | 348/465 |
| 5,666,487 A | 9/1997 | Goodman et al. | |
| 5,666,645 A | 9/1997 | Thomas et al. | |
| 5,673,089 A | 9/1997 | Yuen et al. | 604/95 |
| 5,675,575 A | 10/1997 | Wall, Jr. et al. | 370/326 |
| 5,684,525 A | 11/1997 | Klosterman | 348/12 |
| 5,692,214 A | 11/1997 | Levine | 395/833 |
| 5,701,383 A | 12/1997 | Russo et al. | 386/46 |
| 5,703,877 A | 12/1997 | Nuber et al. | |
| 5,710,601 A | 1/1998 | Marshall et al. | 348/564 |
| 5,715,515 A | 2/1998 | Akins, III et al. | 455/4.1 |
| 5,716,273 A | 2/1998 | Yuen | 463/29 |
| 5,724,203 A | 3/1998 | Kwoh et al. | 360/72.3 |
| 5,724,525 A | 3/1998 | Beyers, II et al. | 395/240 |
| 5,727,060 A | 3/1998 | Young | 380/10 |
| 5,731,844 A | 3/1998 | Rauch et al. | 348/563 |
| 5,751,282 A | 5/1998 | Girard et al. | 345/327 |
| 5,754,940 A | 5/1998 | Smith et al. | 455/5.1 |
| 5,757,416 A | 5/1998 | Birch et al. | 348/6 |
| 5,764,739 A | 6/1998 | Patton et al. | 379/106.03 |
| 5,771,064 A | 6/1998 | Lett | 348/10 |
| 5,790,198 A | 8/1998 | Roop et al. | 348/460 |
| 5,790,806 A | 8/1998 | Koperda | 395/200.82 |
| 5,793,410 A | 8/1998 | Rao | |
| 5,801,753 A | 9/1998 | Eyer | 348/13 |
| 5,801,787 A | 9/1998 | Schein et al. | 348/569 |
| 5,805,204 A | 9/1998 | Thompson et al. | 348/13 |
| 5,808,608 A | 9/1998 | Young et al. | 345/327 |

| | | | |
|---|---|---|---|
| 5,809,204 A | 9/1998 | Young et al. ............... 386/83 |
| 5,812,205 A | 9/1998 | Milnes et al. ............. 348/460 |
| 5,828,420 A | 10/1998 | Marshall et al. ........... 348/564 |
| 5,828,945 A | 10/1998 | Klosterman ................ 455/4.2 |
| RE35,954 E | 11/1998 | Levine ..................... 380/10 |
| 5,844,600 A | 12/1998 | Kerr |
| 5,844,620 A | 12/1998 | Coleman .................. 348/461 |
| 5,850,218 A | 12/1998 | Lajoie et al. ............. 345/327 |
| 5,852,478 A | 12/1998 | Kwoh ...................... 348/734 |
| 5,854,840 A | 12/1998 | Cannella, Jr. ............... 380/9 |
| 5,859,949 A | 1/1999 | Yanagihara |
| 5,867,208 A | 2/1999 | McLaren |
| 5,870,150 A | 2/1999 | Yuen ...................... 348/553 |
| 5,870,474 A | 2/1999 | Wasilewski et al. ......... 380/21 |
| 5,880,768 A | 3/1999 | Lemmons .................. 348/1 |
| 5,894,328 A | 4/1999 | Negishi |
| 5,914,757 A * | 6/1999 | Dean et al. ............... 348/584 |
| 5,915,068 A | 6/1999 | Levine .................... 386/83 |
| 5,917,830 A | 6/1999 | Chen et al. |
| 5,926,230 A | 7/1999 | Niijima et al. |
| 5,949,476 A | 9/1999 | Pocock et al. .............. 348/24 |
| 5,956,088 A | 9/1999 | Shen et al. |
| 5,966,120 A | 10/1999 | Arazi et al. |
| 5,978,043 A | 11/1999 | Blonstein et al. |
| 6,022,223 A | 2/2000 | Taniguchi et al. |
| 6,029,045 A | 2/2000 | Picco et al. |
| 6,044,396 A | 3/2000 | Adams |
| 6,061,399 A | 5/2000 | Lyons et al. |
| 6,061,451 A | 5/2000 | Muratani et al. |
| 6,131,161 A | 10/2000 | Linnartz |
| 6,141,448 A | 10/2000 | Khansari et al. |
| 6,147,714 A * | 11/2000 | Terasawa et al. ........... 348/564 |
| 6,160,545 A | 12/2000 | Eyer et al. |
| 6,169,843 B1 | 1/2001 | Lenihan et al. |
| 6,177,931 B1 * | 1/2001 | Alexander et al. ........... 725/52 |
| 6,188,725 B1 | 2/2001 | Sugiyama |
| 6,259,487 B1 | 7/2001 | Bril |
| 6,359,910 B1 | 3/2002 | Takahashi |
| 6,385,771 B1 | 5/2002 | Gordon et al. |
| 6,401,242 B1 | 6/2002 | Eyer et al. |
| 6,415,437 B1 * | 7/2002 | Ludvig et al. .............. 725/41 |
| 6,456,782 B1 | 9/2002 | Kubota et al. |
| 6,459,427 B1 | 10/2002 | Mao et al. |
| 6,481,012 B1 | 11/2002 | Gordon et al. |
| 6,577,350 B1 * | 6/2003 | Proehl et al. .............. 348/564 |
| 6,584,125 B1 | 6/2003 | Katto |
| 6,584,153 B1 * | 6/2003 | Gordon et al. .......... 375/240.13 |
| 6,594,271 B1 | 7/2003 | Wu |
| 6,621,870 B1 * | 9/2003 | Gordon et al. .......... 375/240.28 |
| 6,625,810 B1 | 9/2003 | Murphy et al. |
| 6,671,882 B1 | 12/2003 | Murphy et al. |
| 6,763,522 B1 | 7/2004 | Kondo et al. |
| 6,828,993 B1 | 12/2004 | Hendricks et al. |
| 7,150,029 B1 * | 12/2006 | Ebling et al. .............. 725/39 |
| 2001/0005447 A1 | 6/2001 | Kawamura et al. |
| 2002/0120933 A1 * | 8/2002 | Knudson et al. ............. 725/42 |
| 2003/0091339 A1 * | 5/2003 | Isozaki ................... 386/96 |
| 2004/0107439 A1 * | 6/2004 | Hassell et al. ............. 725/44 |

FOREIGN PATENT DOCUMENTS

| EP | 0725539 | 8/1996 |
|---|---|---|
| EP | 0 966 164 A2 | 12/1999 |
| WO | 9746007 | 12/1997 |
| WO | WO 98/53611 | 11/1998 |
| WO | WO 00/05890 | 2/2000 |
| WO | WO 00/05892 | 2/2000 |
| WO | 0064164 | 10/2000 |
| WO | 0064169 | 10/2000 |

OTHER PUBLICATIONS

Examiner's Report in CA 2,680,673 dated Oct. 7, 2010.
Partial European Search Report for EP 07007019 dated Feb. 7, 2011.

* cited by examiner

| | | | | | | | | |
|---|---|---|---|---|---|---|---|---|
| $O_3/S_1$ | ... | $O_3/S_N$ | $O_6/S_{N+1}$ | ... | $O_6/S_{2N}$ | $O_9/S_{2N+1}$ | ... | $O_9/S_{3N}$ |
| $O_2/S_1$ | ... | $O_2/S_N$ | $O_5/S_{N+1}$ | ... | $O_5/S_{2N}$ | $O_8/S_{2N+1}$ | ... | $O_8/S_{3N}$ |
| $O_1/S_1$ | ... | $O_1/S_N$ | $O_4/S_{N+1}$ | ... | $O_4/S_{2N}$ | $O_7/S_{2N+1}$ | ... | $O_7/S_{3N}$ |

SLICE-BASED PARTITIONING (B)

| | | |
|---|---|---|
| $O_3$ | $O_6$ | $O_9$ |
| $O_2$ | $O_5$ | $O_8$ |
| $O_1$ | $O_4$ | $O_7$ |

OBJECTS (A)

*FIG. 23.*

METHOD AND SYSTEM FOR PROVIDING A PROGRAM GUIDE AND MULTIPLE VIDEO STREAMS USING SLICE-BASED ENCODING

CROSS-REFERENCES TO RELATED APPLICATIONS

The present application is a continuation of commonly owned U.S. patent application Ser. No. 09/454,216, filed Dec. 9, 1999, now U.S. Pat. No. 6,481,012 entitled "Picture-In-Picture and Multiple Video Streams Using Slice-Based Encoding," which is a continuation-in-part of commonly-owned U.S. patent application Ser. No. 09/428,066, filed Oct. 27, 1999, now U.S. Pat. No. 6,651,252 entitled "Method and Apparatus for Transmitting Video and Graphics in a Compressed Form."

BACKGROUND OF THE INVENTION

1. Field of the Invention

The invention relates to communications systems in general and, more specifically, the invention relates to a multi-functional user interface and related encoding techniques for use in an interactive multimedia information delivery system.

2. Description of the Background Art

Over the past few years, the television industry has seen a transformation in a variety of techniques by which its programming is distributed to consumers. Cable television systems are doubling or even tripling system bandwidth with the migration to hybrid fiber coax (HFC) cable transmission systems. Customers unwilling to subscribe to local cable systems have switched in high numbers to direct broadcast satellite (DBS) systems. And, a variety of other approaches have been attempted focusing primarily on high bandwidth digital technologies, intelligent two way set top boxes, or other methods of attempting to offer service differentiated from standard cable and over the air broadcast systems.

With this increase in bandwidth, the number of programming choices has also increased. Leveraging off the availability of more intelligent set top boxes, several companies have developed elaborate systems for providing an interactive listing of a vast array of channel offerings, expanded textual information about individual programs, the ability to look forward to plan television viewing as much as several weeks in advance, and the option of automatically programming a video cassette recorder (VCR) to record a future broadcast of a television program.

Unfortunately, the existing program guides have several drawbacks. They tend to require a significant amount of memory, some of them needing upwards of one megabyte of memory at the set top terminal (STT). They are very slow to acquire their current database of programming information when they are turned on for the first time or are subsequently restarted (e.g., a large database may be downloaded to a STT using only a vertical blanking interval (VBI) data insertion technique). Disadvantageously, such slow database acquisition may result in out-of-date database information or, in the case of a pay-per-view (PPV) or video-on-demand (VOD) system, limited scheduling flexibility for the information provider.

In addition, existing program guides with point-to-point delivery mechanisms suffer linear decay in response time with respect to the number of subscribers served. The response time starts in the sub-second range with a handful of subscribers but seems to quickly exceed 3 seconds as the number of subscribers extends into the low thousands (2 to 4 thousand).

Another point of concern is the still-based, banner and audio (radio-style) advertisements (ads) in current program guides. These ads require different production and delivery methods from standard cable advertising practice. This practically precludes the operator from directly capitalizing on this capability due to the costs of maintaining a distinct and separate infrastructure to support the required methods. And, the value of still-based and banner ads is far less than full motion ads.

Existing program guides generally have only a single video content to be shared among many guide pages. Features such as multiple different video content, such as picture-in-picture (PIP), are not supported in existing program guides on single tuner set top boxes. Within this context, PIP refers to user interface screen that may carry one or more different video content. Existing program guides lack support for fully functional electronic commerce and video on-demand application interfaces. For integration with future applications, an extensible interactive system is required with its ability to integrate with multiple sources of full-motion video and play them interchangeably from a single tuner in the set top box, to open up a world of possible applications in the areas of interactive shopping, internet-enhanced television and other real-time information services.

Therefore, it is desirable to provide an efficient interactive multimedia delivery system which provides encoding, multiplexing, demultiplexing to enable multiple video streams within a program guide and to support electronic commerce and other applications with a multi-functional user interface.

SUMMARY OF THE INVENTION

The present invention overcomes the above-described problems and drawbacks relating to existing technology by including additional slice-based encoding, multiplexing, and demultiplexing methods of program guides and user interfaces. This invention enables program guides that include multiple video streams for picture-in-picture and other applications. In addition, this invention enables user interfaces which are multi-functional and may be used for electronic commerce and other applications.

A method for encoding a program guide in accordance with this invention includes: encoding a first set of slices for each of a plurality of graphics pages; and encoding a second set of slices for each of a plurality of video streams. Similarly, a bitstream for representing a program guide in accordance with this invention includes: a first set of packets including a set of slices for each of a plurality of graphics pages; and a second set of packets including a set of slices for each of a plurality of video streams.

BRIEF DESCRIPTION OF THE DRAWINGS

The teachings of the present invention can be readily understood by considering the following detailed description in conjunction with the accompanying drawings, in which:

FIG. 23 is a schematic diagram illustrating slice-based partitioning of multiple objects in accordance with an embodiment of this invention;

To facilitate understanding, identical reference numerals have been used, where possible, to designate identical elements that are common to the figures.

DESCRIPTION OF THE SPECIFIC EMBODIMENTS

Figure 1:
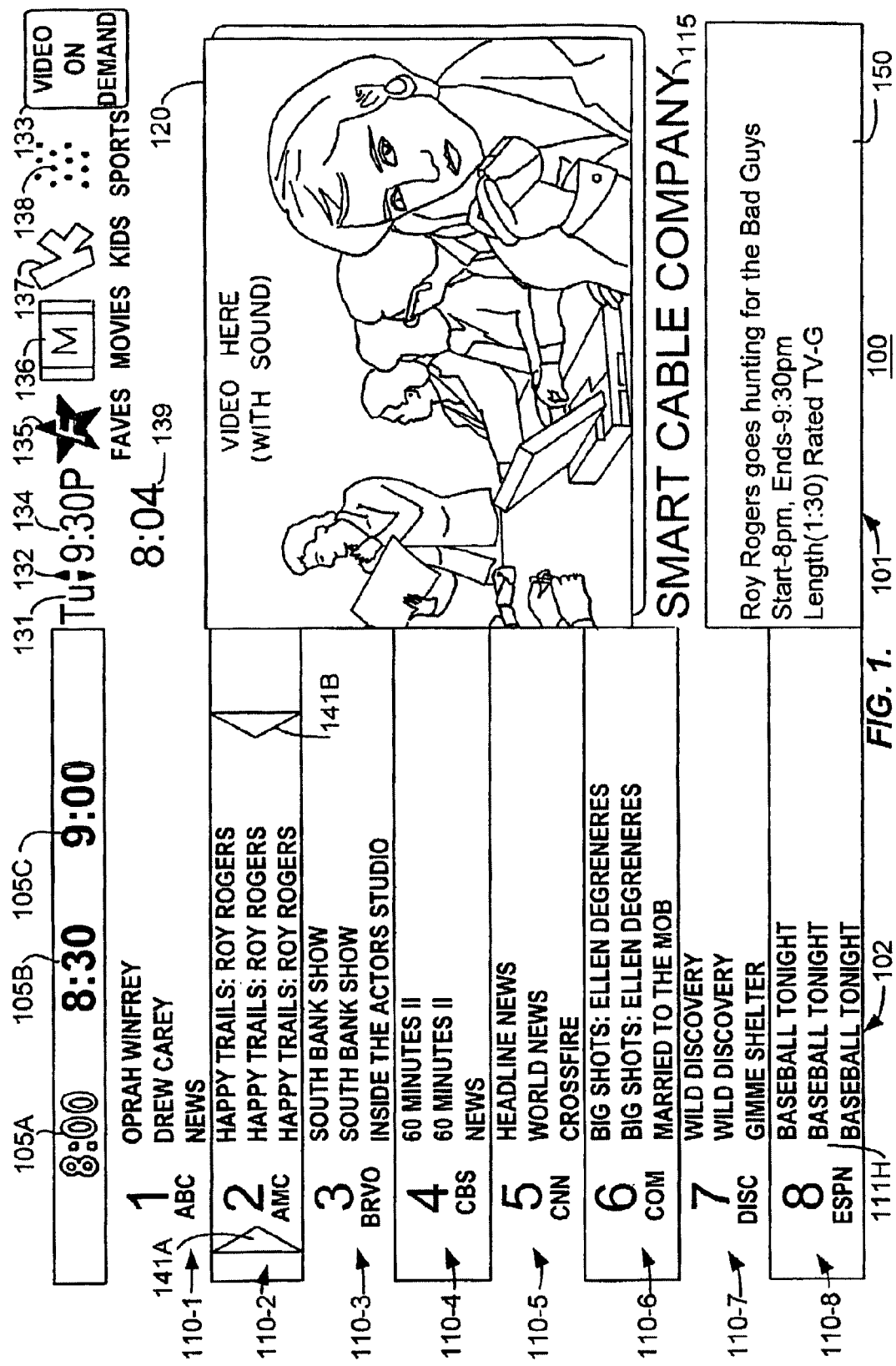
FIG. 1 depicts an example of one frame of an interactive program guide (IPG) taken from a video sequence that can be encoded using he present invention.

This invention is a system for generating, distributing and receiving a transport stream containing compressed video and graphics information. The invention is illustratively used to encode a plurality of interactive program guides (IPGs) that enable a user to interactively review, preview and select programming for a television system.

The invention uses compression techniques to reduce the amount of data to be transmitted and increase the speed of transmitting program guide information. As such, the data to be transmitted is compressed so that the available transmission bandwidth is used more efficiently. To transmit an IPG having both graphics and video, the invention separately encodes the graphics from the video such that the encoder associated with each portion of the IPG can be optimized to best encode the associated portion. The invention illustratively uses a slice-based, predictive encoding process that is based upon the Moving Pictures Experts Group (MPEG) standard known as MPEG-2. MPEG-2 is specified in the ISO/IEC standards 13818, which is incorporated herein by reference.

The above-referenced standard describes data processing and manipulation techniques that are well suited to the compression and delivery of video, audio and other information using fixed or variable rate digital communications systems. In particular, the above-referenced standard, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

To enhance error recovery, the MPEG-2 standard contemplates the use of a "slice layer" where a video frame is divided into one or more slices. A slice contains one or more contiguous sequence of macroblocks. The sequence begins and ends at any macroblock boundary within the frame. An MPEG-2 decoder, when provided a corrupted bitstream, uses the slice layer to avoid reproducing a completely corrupted frame. For example, if a corrupted bitstream is decoded and the decoder determines that the present slice is corrupted, the decoder skips to the next slice and begins decoding. As such, only a portion of the reproduced picture is corrupted.

The present invention uses the slice layer for the main purpose of flexible encoding and compression efficiency in a head end centric end-to-end system. A slice-based encoding system enables the graphics and video of an IPG to be efficiently coded and flexibly transmitted as described below. Consequently, a user can easily and rapidly move from one IPG page to another IPG page.

A. An Exemplary Interactive Program Guide

The present invention can be employed for compressing and transmitting various types of video frame sequences that contain graphics and video information, and is particularly useful in compressing and transmitting interactive program guides (IPG) where a portion of the IPG contains video (referred to herein as the video portion) and a portion of the IPG contains a programming guide grid (referred to herein as the guide portion or graphics portion). The present invention slice-based encodes the guide portion separately from the slice-based encoded video portion, transmits the encoded portions within a transport stream, and reassembles the encoded portions to present a subscriber (or user) with a comprehensive IPG. Through the IPG, the subscriber can identify available programming and select various services provided by their information service provider.

FIG. 1 depicts a frame from an illustrative IPG page 100. In this particular embodiment of an IPG, the guide grid information is contained in portion 102 (left half page) and the video information is contained in portion 101 (right half page). The IPG display 100 comprises a first 105A, second 105B and third 105C time slot objects, a plurality of channel content objects 110-1 through 110-8, a pair of channel indicator icons 141A, 141B, a video barker 120 (and associated audio barker), a cable system or provider logo 115, a program description region 150, a day of the week identification object 131, a time of day object 139, a next time slot icon 134, a temporal increment/decrement object 132, a "favorites" filter object 135, a "movies" filter object 136, a "kids" (i.e., juvenile) programming filter icon 137, a "sports" programming filter object 138 and a VOD programming icon 133. It should be noted that the day of the week object 131 and next time slot icon 134 may comprise independent objects (as depicted in FIG. 1) or may be considered together as parts of a combined object.

A user may transition from one IPG page to another, where each page contains a different graphics portion 102, i.e., a different program guide graphics. The details regarding the encoding and decoding of a series of IPG pages in accordance with the present invention are provided below.

Details regarding the operation of the IPG page of FIG. 1, the interaction of this page with other pages and with a user are described in commonly assigned U.S. patent application Ser. No. 09/359,560, filed Jul. 23, 1999 which is hereby incorporated herein by reference.

B. System

Figure 2:
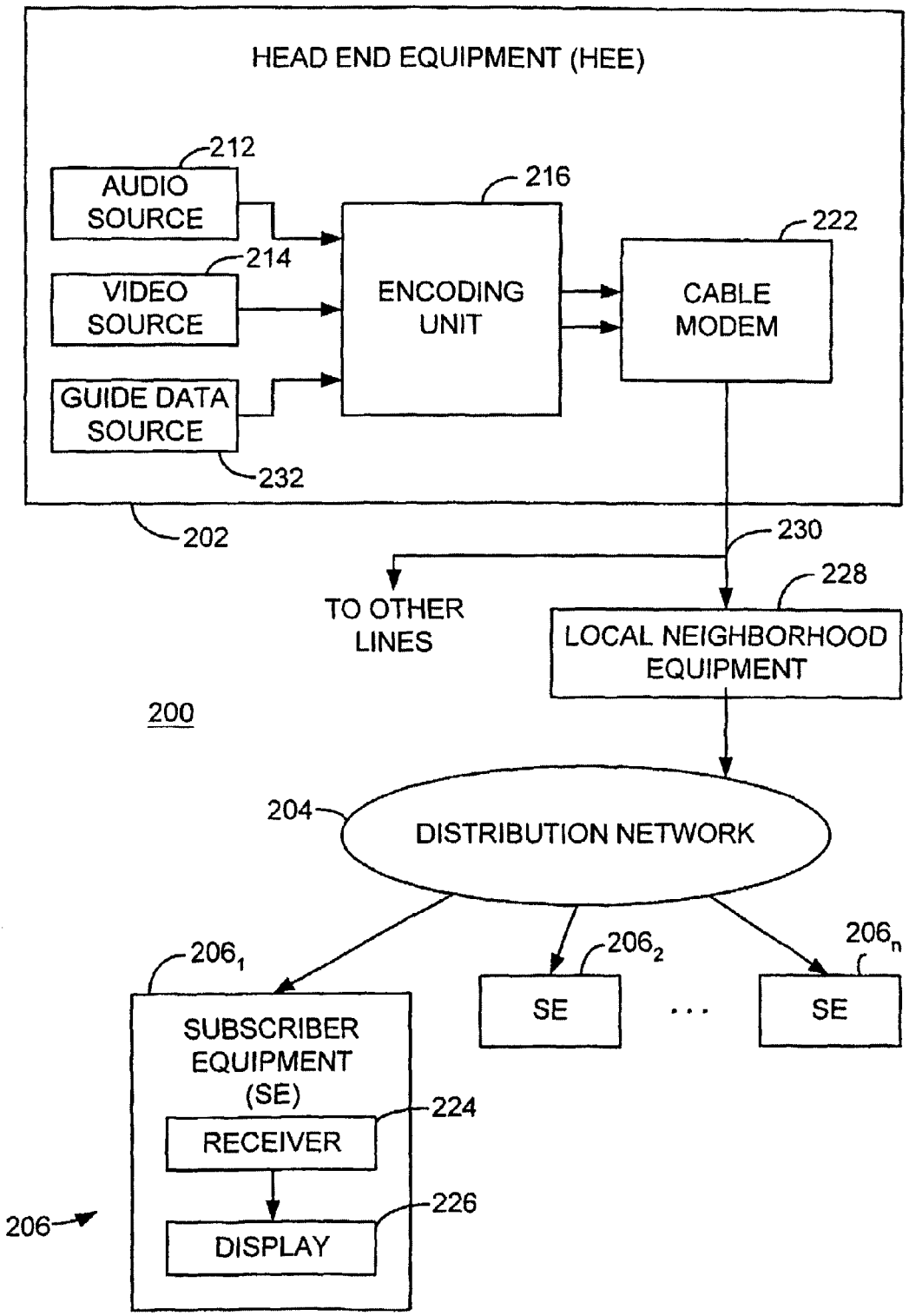
FIG. 2 depicts a block diagram of an illustrative interactive information distribution system that includes the encoding unit and process of the present invention.

FIG. 2 depicts a high-level block diagram of an information distribution system 200, e.g., a video-on-demand system or digital cable system, that incorporates the present invention. The system 200 contains head end equipment (HEE) 202, local neighborhood equipment (LNE) 228, a distribution network 204 (e.g., hybrid fiber-coax network) and subscriber equipment (SE) 206. This form of information distribution system is disclosed in commonly assigned U.S. patent application Ser. No. 08/984,710 filed Dec. 3, 1997. The system is known as DIVATM provided by DIVA Systems Corporation.

The HEE 202 produces a plurality of digital streams that contain encoded information in illustratively MPEG-2 compressed format. These streams are modulated using a modulation technique that is compatible with a communications channel 230 that couples the HEE 202 to one or more LNE (in FIG. 1, only one LNE 228 is depicted). The LNE 228 is illustratively geographically distant from the HEE 202. The LNE 228 selects data for subscribers in the LNE's neighborhood and remodulates the selected data in a format that is compatible with distribution network 204. Although the system 200 is depicted as having the HEE 202 and LNE 228 as separate components, those skilled in the art will realize that the functions of the LNE may be easily incorporated into the HEE202. It is also important to note that the presented slice-based encoding method is not constrained to physical location of any of the components. The subscriber equipment (SE) 206, at each subscriber location 2061, 2062, ☐, 206n, comprises a receiver 224 and a display 226. Upon receiving a stream, the subscriber equipment receiver 224 extracts the information from the received signal and decodes the stream to produce the information on the display, i.e., produce a television program, IPG page, or other multimedia program.

In an interactive information distribution system such as the one described in commonly assigned U.S. patent application Ser. No. 08/984,710, filed Dec. 3, 1997, the program streams are addressed to particular subscriber equipment locations that requested the information through an interactive menu. A related interactive menu structure for requesting video-on-demand is disclosed in commonly assigned U.S. patent application Ser. No. 08/984,427, filed Dec. 3, 1997. Another example of interactive menu for requesting multimedia services is the interactive program guide (IPG) disclosed in commonly assigned U.S. patent application No. 60/093,891, filed in Jul. 23, 1998.

To assist a subscriber (or other viewer) in selecting programming, the HEE 202 produces information that can be assembled to create an IPG such as that shown in FIG. 1. The HEE produces the components of the IPG as bitstreams that are compressed for transmission in accordance with the present invention.

A video source 214 supplies the video sequence for the video portion of the IPG to an encoding unit 216 of the present invention. Audio signals associated with the video sequence are supplied by an audio source 212 to the encoding and multiplexing unit 216. Additionally, a guide data source 232 provides program guide data to the encoding unit 216. This data is typically in a database format, where each entry describes a particular program by its title, presentation time, presentation date, descriptive information, channel, and program source.

The encoding unit 216 compresses a given video sequence into one or more elementary streams and the graphics produced from the guide data into one or more elementary streams. As described below with respect to FIG. 4, the elementary streams are produced using a slice-based encoding technique. The separate streams are coupled to the cable modem 222.

The streams are assembled into a transport stream that is then modulated by the cable modem 222 using a modulation format that is compatible with the head end communications channel 230. For example, the head end communications channel may be a fiber optic channel that carries high speed data from the HEE 202 to a plurality of LNE 228. The LNE 228 selects IPG page components that are applicable to its neighborhood and remodulates the selected data into a format that is compatible with a neighborhood distribution network 204. A detailed description of the LNE 228 is presented below with respect to FIG. 5.

The subscriber equipment 206 contains a receiver 224 and a display 226 (e.g., a television). The receiver 224 demodulates the signals carried by the distribution network 204 and decodes the demodulated signals to extract the IPG pages from the stream. The details of the receiver 224 are described below with respect to FIG. 14.

C. Encoding Unit 216

The system of the present invention is designed specifically to work in a slice-based ensemble encoding environment, where a plurality of bitstreams are generated to compress video information using a sliced-based technique. In the MPEG-2 standard, a "slice layer" may be created that divides a video frame into one or more "slices". Each slice includes one or more macroblocks, where the macroblocks are illustratively defined as rectangular groups of pixels that tile the entire frame, e.g., a frame may consist of 30 rows and 22 columns of macroblocks. Any slice may start at any macroblock location in a frame and extend from left to right and top to bottom through the frame. The stop point of a slice can be chosen to be any macroblock start or end boundary. The slice layer syntax and its conventional use in forming an MPEG-2 bitstream is well known to those skilled in the art and shall not be described herein.

Figure 3:
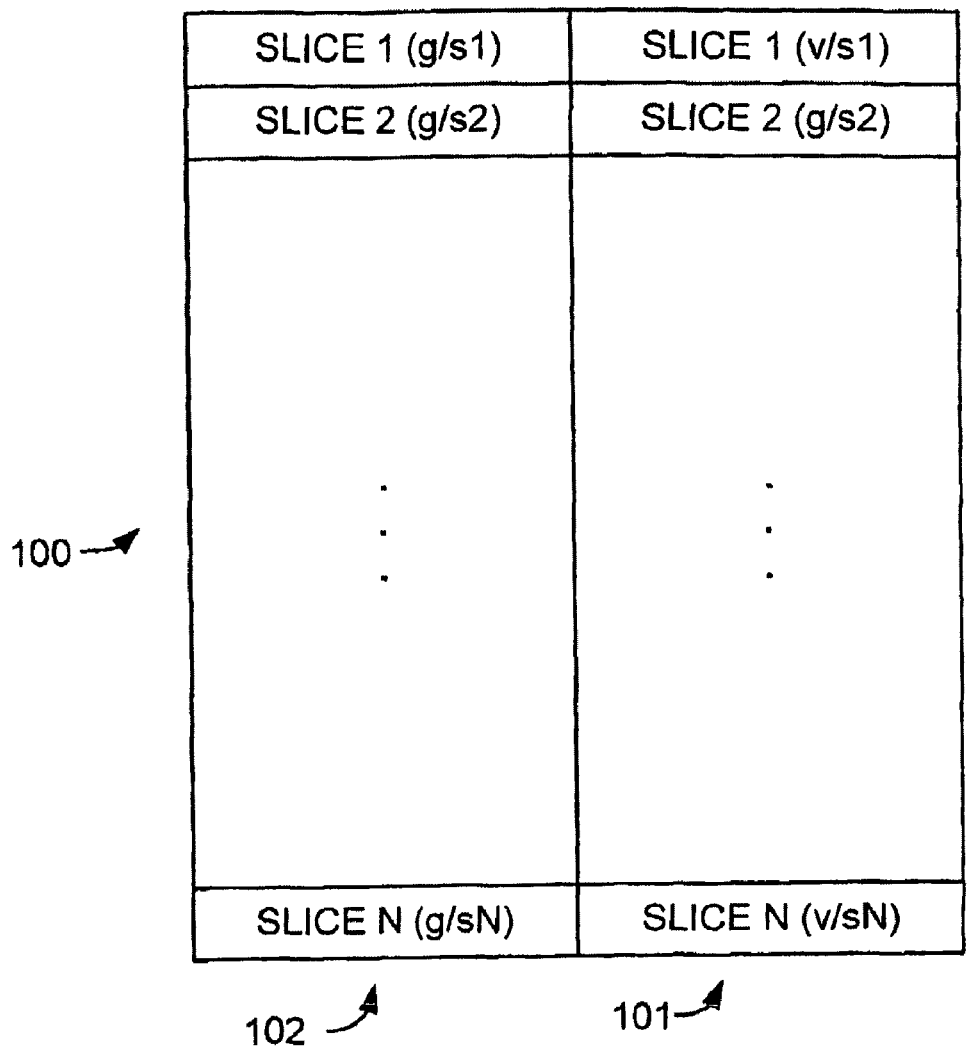
FIG. 3 depicts a slice map for the IPG of FIG. 1.

When the invention is used to encode an IPG comprising a graphics portion and a video portion, the slice-based technique separately encodes the video portion of the IPG and the grid graphics portion of the IPG. As such, the grid graphics portion and the video portion are represented by one or more different slices. FIG. 3 illustrates an exemplary slice division of an IPG 100 where the guide portion 102 and the video portion 101 are each divided into N slices (e.g., g/s1 through g/sN and v/s1 through v/sN). Each slice contains a plurality of macroblocks, e.g., 22 macroblocks total and 11 macroblocks in each portion. The slices in the graphics portion are pre-encoded to form a "slice form grid page" database that contains a plurality of encoded slices of the graphics portion. The encoding process can also be performed real-time during the broadcast process depending on the preferred system implementation. In this way, the graphics slices can be recalled from the database and flexibly combined with the separately encoded video slices to transmit the IPG to the LNE and, ultimately, to the subscribers. The LNE assembles the IPG data for the neighborhood as described below with respect to FIG. 5. Although the following description of the invention is presented within the context of an IPG, it is important to note that the method and apparatus of the invention is equally applicable to a broad range of applications, such as broadcast video on demand delivery, e-commerce, internet video education services, and the like, where delivery of video sequences With common content is required.

Figure 4:
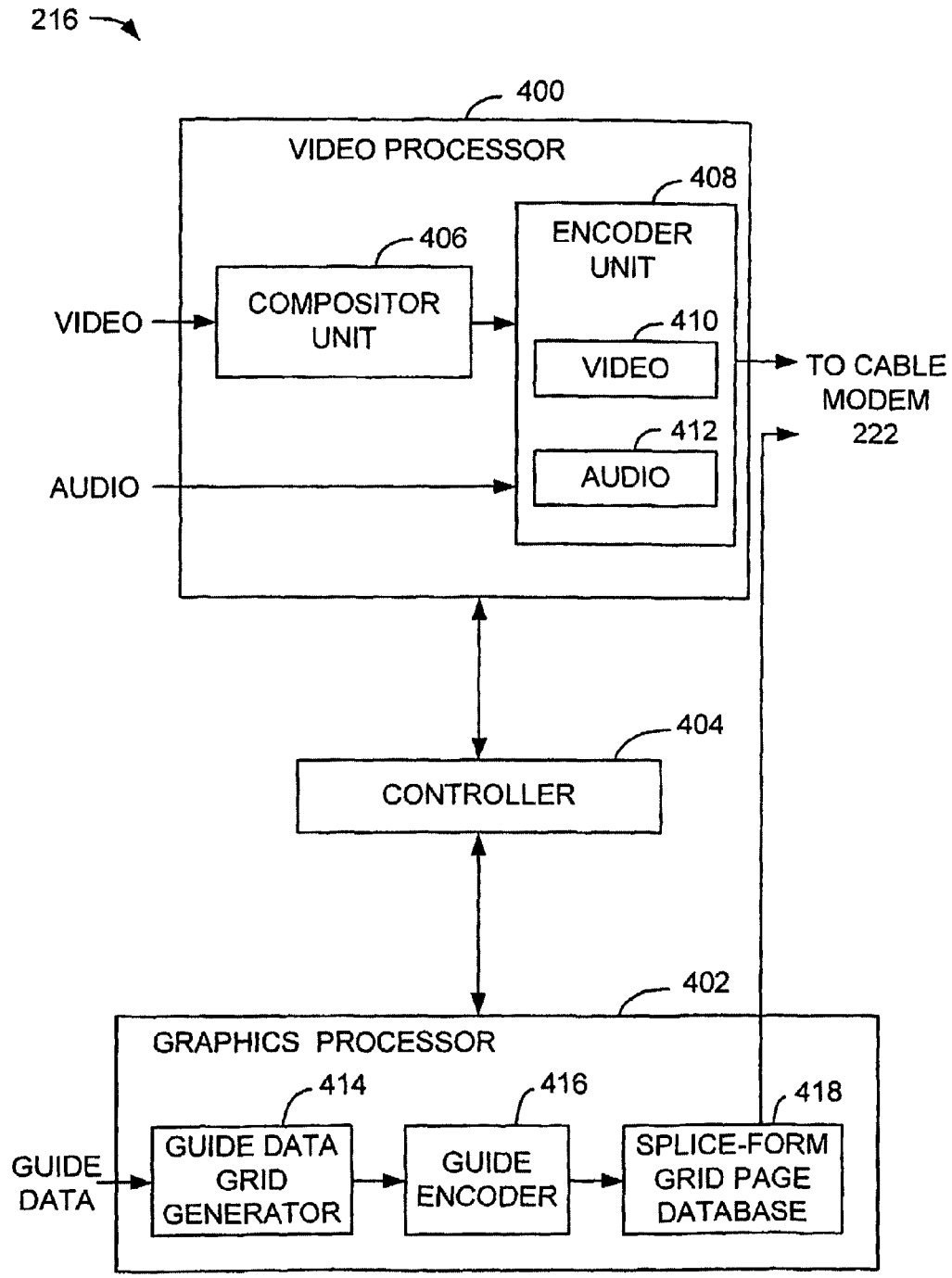
FIG. 4 depicts a block diagram of the encoding unit of FIG. 2.

As depicted in FIG. 4, the encoding unit 216 receives a video sequence and an audio signal. The audio source comprises, illustratively, audio information that is associated with a video portion in the video sequence such as an audio track associated with still or moving images. For example, in the case of a video sequence representing a movie trailer, the audio stream is derived from the source audio (e.g., music and voice-over) associated with the movie trailer.

The encoding unit 216 comprises video processor 400, a graphics processor 402 and a controller 404. The video processor 400 comprises a compositor unit 406 and an encoder unit 408. The compositor unit 406 combines a video sequence with advertising video, advertiser or service provider logos, still graphics, animation, or other video information. The encoder unit 408 comprises one or more video encoders 410, e.g., a real-time MPEG-2 encoder and an audio encoder 412, e.g., an AC-3 encoder. The encoder unit 408 produces one or more elementary streams containing slice-based encoded video and audio information.

The video sequence is coupled to a real time video encoder 410. The video encoder then forms a slice based bitstream, e.g., an MPEG-2 compliant bit stream, for the video portion of an IPG. For purposes of this discussion, it is assumed that the GOP structure consists of an I-picture followed by ten B-pictures, where a P-picture separates each group of two B-pictures (i.e., "I-B-B-P-B-B-P-B-B-P-B-B-P-B-B"), however, any GOP structure and size may be used in different configurations and applications.

The video encoder 410 "pads" the graphics portion (illustratively the left half portion of IPG) with null data. This null data is replaced by the graphics grid slices, at a later step, within LNE. Since the video encoder processes only motion video information, excluding the graphics data, it is optimized for motion video encoding.

The controller 404 manages the slice-based encoding process such that the video encoding process is time and spatially synchronized with the grid encoding process. This is achieved by defining slice start and stop locations according to the objects in the IPG page layout and managing the encoding process as defined by the slices.

The graphics portion of the IPG is separately encoded in the graphics processor 402. The processor 402 is supplied guide data from the guide data source (232 in FIG. 2). Illustratively, the guide data is in a conventional database format containing program title, presentation date, presentation time, program descriptive information and the like. The guide data grid generator 414 formats the guide data into a "grid", e.g., having a vertical axis of program sources and a horizontal axis of time increments. One specific embodiment of the guide grid is depicted and discussed in detail above with respect to FIG. 1.

The guide grid is a video frame that is encoded using a video encoder 416 optimized for video with text and graphics content. The video encoder 416, which can be implemented as software, slice-based encodes the guide data grid to produce one or more bitstreams that collectively represent the entire guide data grid. The encoder is optimized to effectively encode the graphics and text content.

The controller 404 defines the start and stop macroblock locations for each slice. The result is a GOP structure having intra-coded pictures containing I-picture slices and predicted pictures containing B and P-picture slices. The I-pictures slices are separated from the predicted picture slices. Each encoded slice is separately stored in a slice form grid page database 418. The individual slices can be addressed and recalled from the database 418 as required for transmission. The controller 404 controls the slice-based encoding process as well as manages the database 418.

D. Local Neighborhood Equipment (LNE) 228

Figure 5:
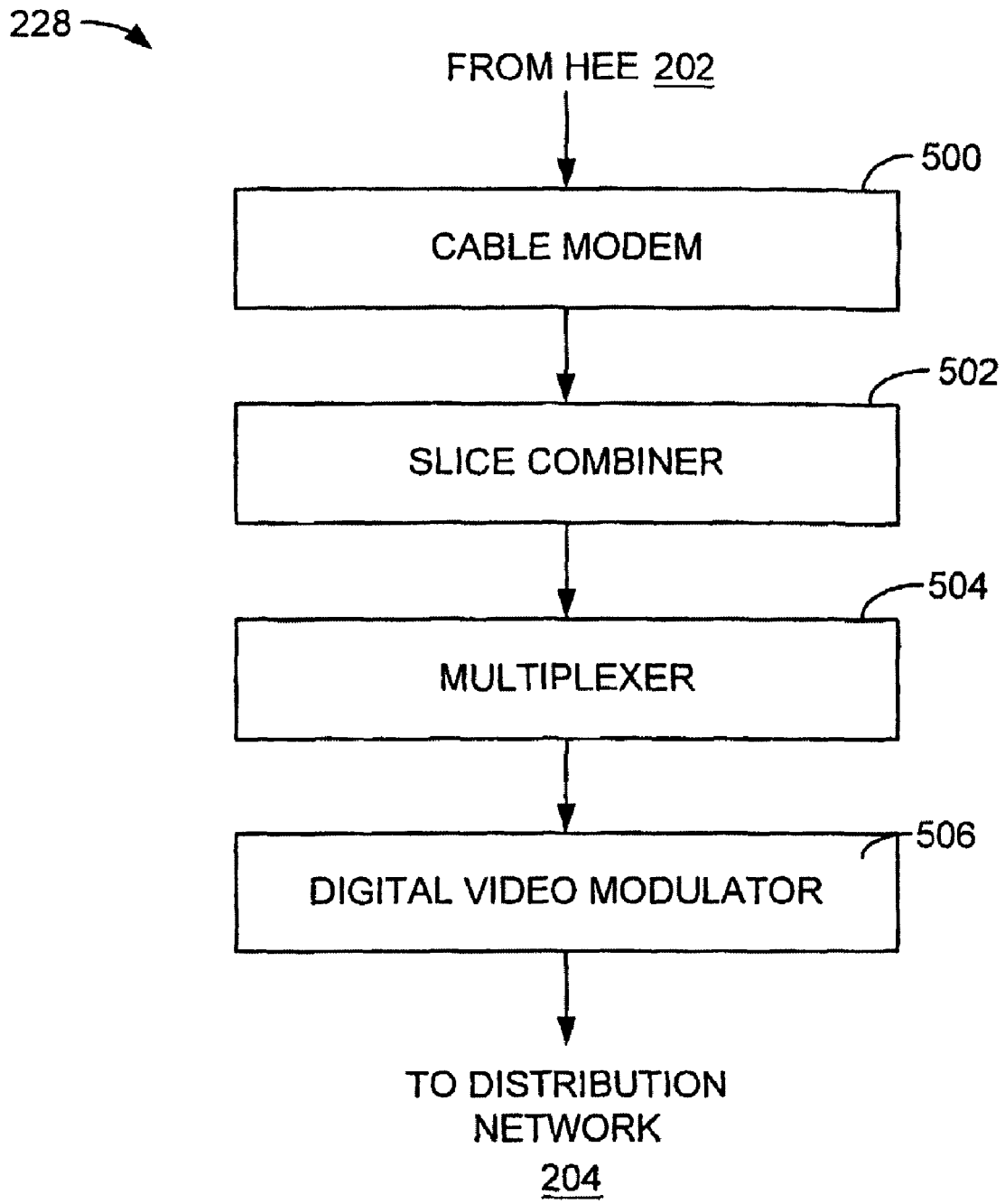
FIG. 5 depicts a block diagram of the local neighborhood network of FIG. 2.

FIG. 5 depicts a block diagram of the LNE 228. The LNE 228 comprises a cable modem 500, slice combiner 502, a multiplexer 504 and a digital video modulator 506. The LNE 228 is coupled illustratively via the cable modem to the HEE 202 and receives a transport stream containing the encoded video information and the encoded guide data grid information. The cable modem 500 demodulates the signal from the HEE 202 and extracts the MPEG slice information from the received signal. The slice combiner 502 combines the received video slices with the guide data slices in the order in which the decoder at receiver side can easily decode without further slice re-organization. The resultant combined slices are PID assigned and formed into an illustratively MPEG compliant transport stream(s) by multiplexer 504. The slice-combiner (scanner) and multiplexer operation is discussed in detail with respect to FIGS. 5-10. The transport stream is transmitted via a digital video modulator 506 to the distribution network 204.

The LNE 228 is programmed to extract particular information from the signal transmitted by the HEE 202. As such, the LNE can extract video and guide data grid slices that are targeted to the subscribers that are connected to the particular LNE. For example, the LNE 228 can extract specific channels for representation in the guide grid that are available to the subscribers connected to that particular LNE. As such, unavailable channels to a particular neighborhood would not be depicted in a subscriber's IPG. Additionally, the IPG can contain targeted advertising, e-commerce, program notes, and the like. As such, each LNE can combine different guide data slices with different video to produce IPG screens that are prepared specifically for the subscribers connected to that particular LNE. Other LNEs would select different IPG component information that is relevant to their associated subscribers.

Figure 6:
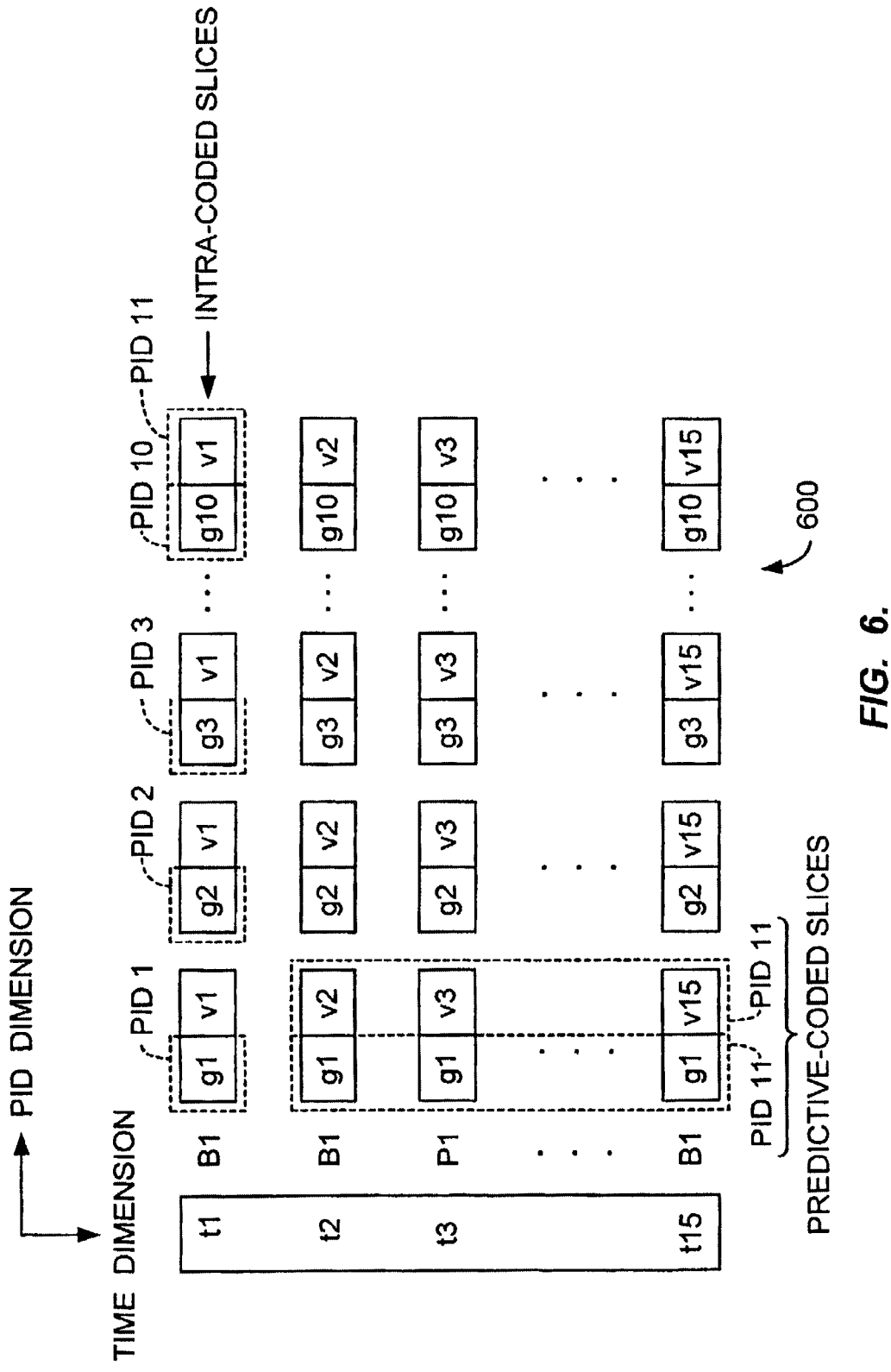
FIG. 6 depicts a matrix representation of program guide data with the data groupings shown for efficient encoding in accordance with the present invention.

FIG. 6 illustrates a matrix representation 600 of a series of IPG pages. In the illustrated example, ten different IPG pages are available at any one time period, e.g., t1, t2, and so on. Each page is represented by a guide portion (g) and a common video portion (v) such that a first IPG page is represented by g1/v1, the second IPG page is represented by g2/v1 and so on. In the illustrative matrix 600, ten identical guide portions (g1-g10) are associated with a first video portion (v1). Each portion is slice-base encoded as described above within the encoding unit (216 of FIG. 4).

FIG. 6 illustrates the assignment of PIDs to the various portions of the IPG pages. In the figure, only the content that is assigned a PID is delivered to a receiver. The intra-coded guide portion slices g1 through g10 are assigned to PID1 through PID10 respectively. One of the common intra-coded video portion v1, illustratively the tenth IPG page, is assigned to PID11. In this form, substantial bandwidth saving is achieved by delivering intra-coded video portion slices v1 only one time. Lastly, the predictive-coded slices g1/v2 through g1/v15 are assigned to PID11. As shown in the figure, a substantial bandwidth saving is achieved by transmitting only one group of illustratively fourteen predicted picture slices, g1/v2 to g1/v15. This is provided by the fact that the prediction error images for each IPG page 1 to 10 through time units t2 to t15 contain the same residual images. Further details of PID assignment process is discussed in next sections.

Figure 7:
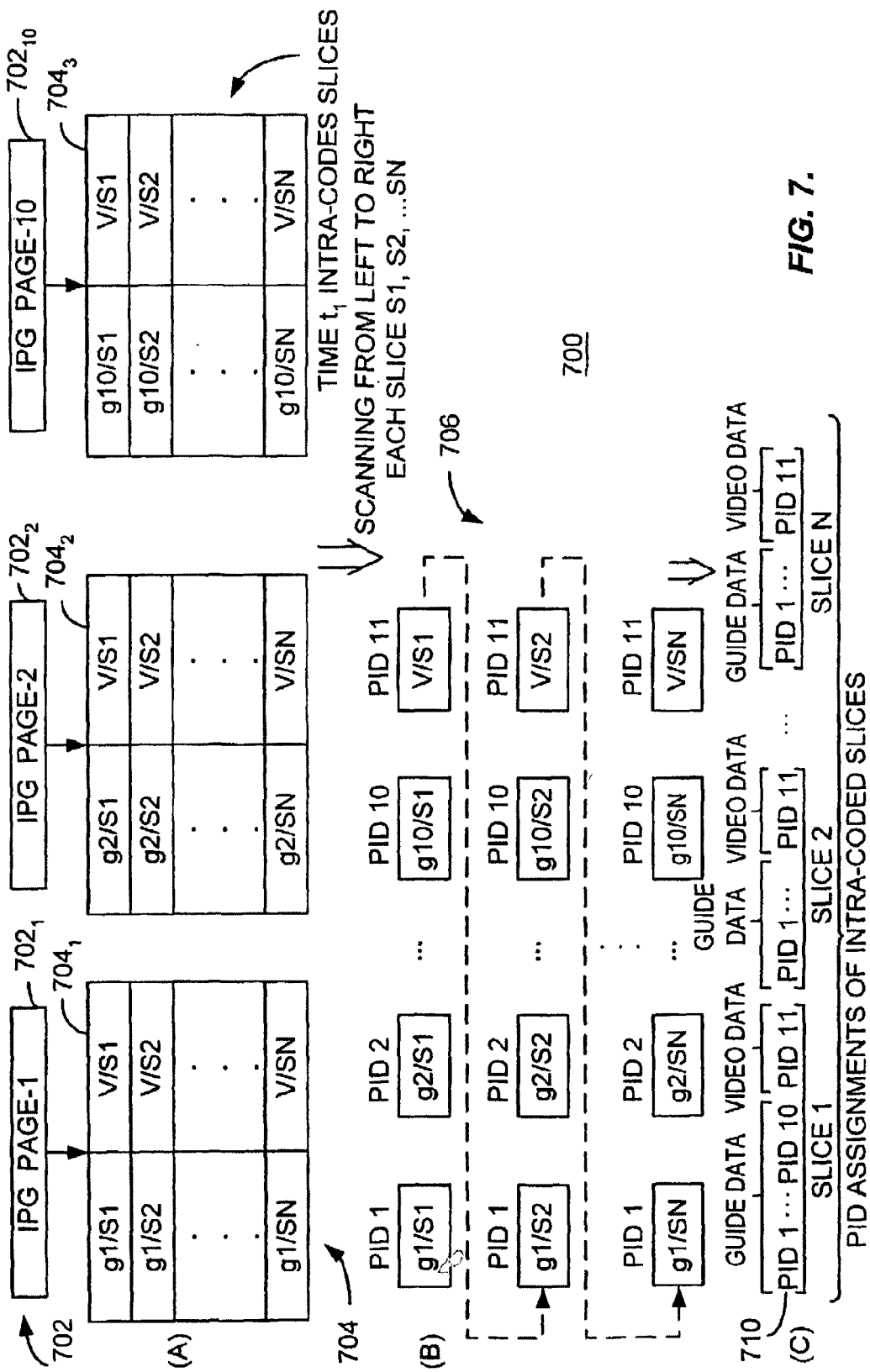
FIG. 7 is a diagrammatic flow diagram of a process for generating a portion of transport stream containing intra-coded video and graphics slices.

FIG. 7 depicts a process 700 that is used to form a bitstream 710 containing all the intra-coded slices encoded at a particular time t1 of FIG. 6. At step 702, a plurality of IPG pages 7021 through 70210 are provided to the encoding unit. At step 704, each page is slice base encoded to form, for example, guide portion slices g1/s1 through g1/sN and video portion slices v/s1 through v/sN for IPG page 1 7041. The slice-based encoding process for video and guide portions can be performed in different forms. For example, guide portion slices can be pre-encoded by a software MPEG-2 encoder or encoded by the same encoder as utilized for encoding the video portion. If the same encoder is employed, the parameters of the encoding process is adjusted dynamically for both portions. It is important to note that regardless of the encoder selection and parameter adjustment, each portion is encoded independently. While encoding the video portion, the encoding is performed by assuming the full frame size (covering both guide and video portions) and the guide portion of the full frame is padded with null data. This step, step 704, is performed at the HEE. At step 706, the encoded video and guide portion slices are sent to the LNE. If the LNE functionality is implemented as part of the HEE, then, the slices are delivered to the LNE as packetized elementary stream format or any similar format as output of the video encoders. If LNE is implemented as a remote network equipment, the encoded slices are formatted in a form to be delivered over a network via a preferred method such as cable modem protocol or any other preferred method. Once the slice-based streams are available in the LNE, the slice combiner at step 706 orders the slices in a form suitable for the decoding method at the receiver equipment. As depicted in FIG. 7(b), the guide portion and video portion slices are ordered in a manner as if the original pictures in FIG. 7(a) are scanned from left to right and top to bottom order. Each of the slice packets are then assigned PID's as discussed in FIG. 6 by the multiplexer; PID1 is assigned to g1/s1 . . . g1/sn, PID2 to g2/s1 . . . g2/sn, . . . , PID10 to g10/s1 . . . g10/sn, and PID11 is assigned to v/s1 . . . v/sn. The resultant transport stream containing the intra-coded slices of video and guide portions is illustrated in FIG. 7(c). Note that based on this transport stream structure, a receiving terminal as discussed in later parts of this description of the invention, retrieves the original picture by constructing the video frames row-by-row, first retrieving, assuming PID1 is desired, e.g., g1/s1 of PID1 then v/s1 of PID11, next g1/s2 of PID1 then v/s2 of PID11 and so on.

Figure 8:
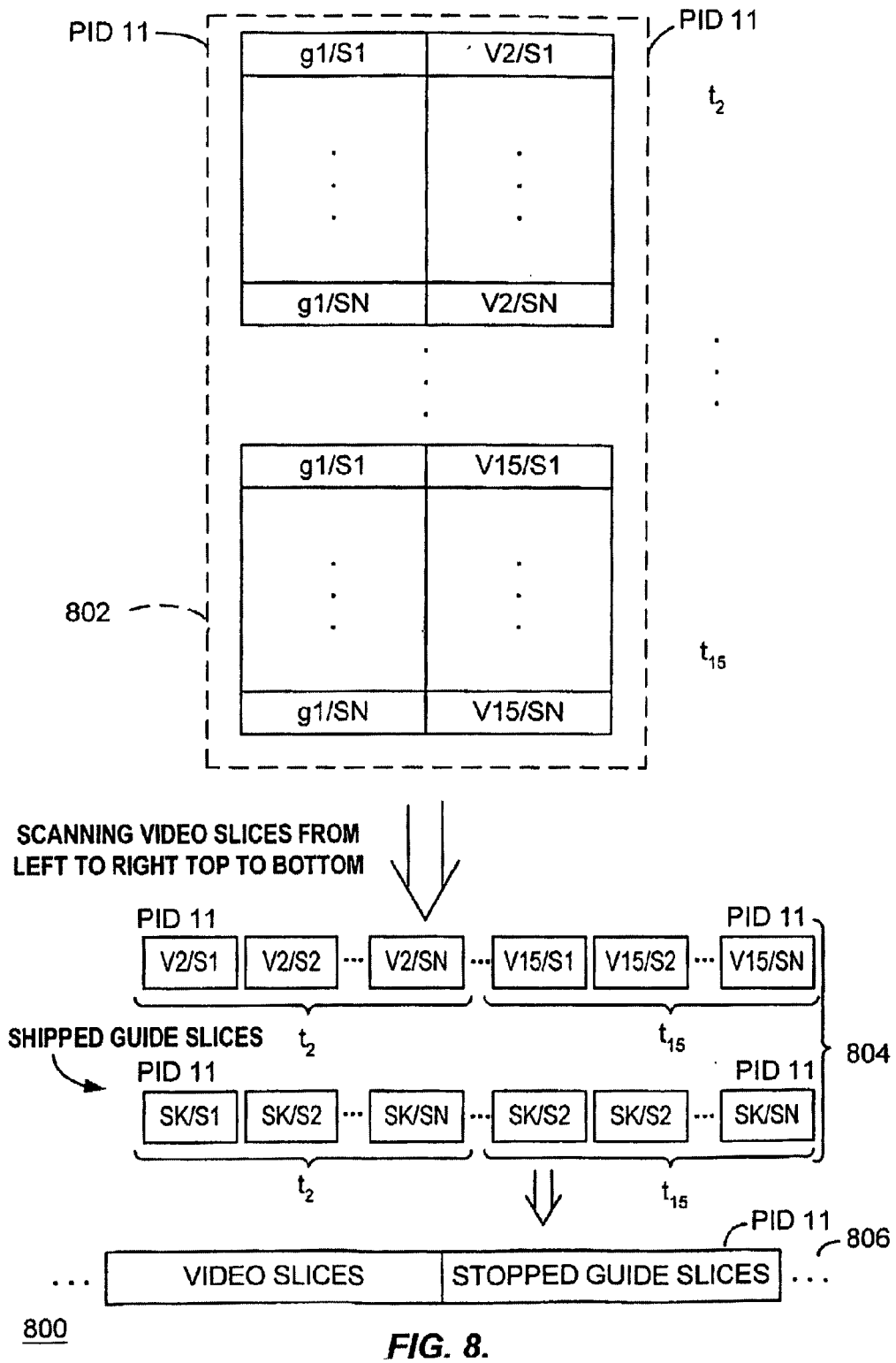
FIG. 8 is a diagrammatic flow diagram of a process for generating a portion of transport stream containing predictive-coded video and graphics slices.

FIG. 8 illustrates a process 800 for producing a bitstream 808 containing the slices from the predictive-coded pictures accompanying the transport stream generation process discussed in FIG. 7 for intra-coded slices. As shown in FIG. 6, illustratively, only the predicted slices belonging to IPG page 1 is delivered. Following the same arguments of encoding process in FIG. 7, at step 802, the predictive-coded slices are generated at the HEE independently and then forwarded to an LNE either as local or in a remote network location. At step 804, slices in the predictive-coded guide and video portion slices, illustratively from time periods t2 to t15, are scanned from left to right and top to bottom in slice-combiner and complete data is assigned PID 11 by the multiplexer. Note that the guide portion slices g1/s1 to g1/sn at each time period t2 to t15 does not change from their intra-coded corresponding values at t1. Therefore, these slices are coded as skipped macroblocks "sK". Conventional encoder systems do not necessarily skip macroblocks in a region even when there is no change from picture to picture. At step 806, the slice packets are ordered into a portion of final transport stream, first including the video slice packets v2/s1 . . . v2/SN to v15/s1 . . . v15/sN, then including the skipped guide slices sK/s1 . . . sK/sN from t2 to t15 in the final transport stream.

Figure 9:
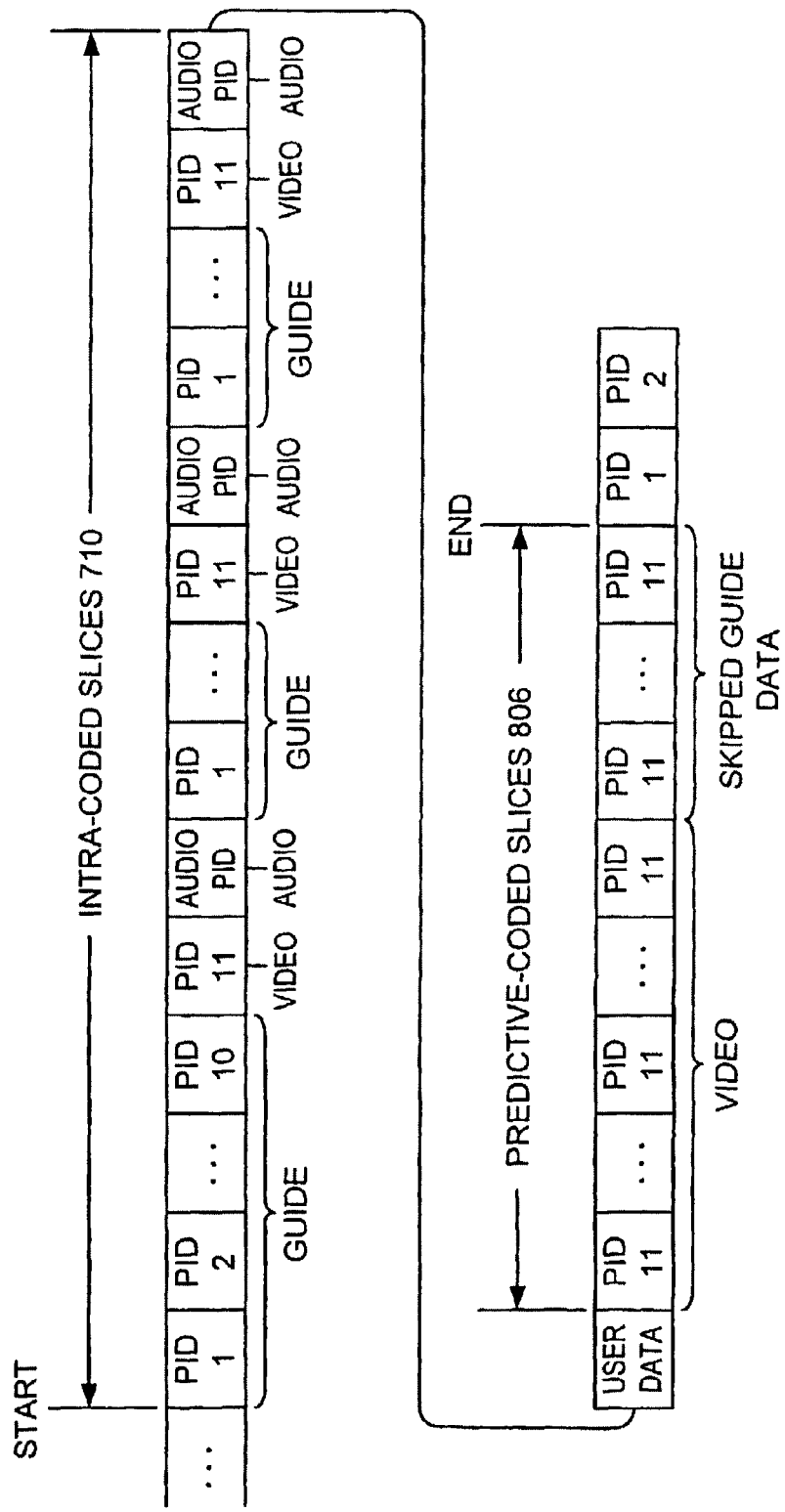
FIG. 9 illustrates a data structure of a transport stream used to transmit the IPG of FIG. 1.

FIG. 9 depicts a complete MPEG compliant transport stream 900 that contains the complete information needed by a decoder to recreate IPG pages that are encoded in accordance with the invention. The transport stream 900 comprises the intra-coded bitstream 710 of the guide and video slices (PIDS1 to 11), a plurality of audio packets 902 identified by an audio PID, and the bitstream 806 containing the predictive-coded slices in PID11. The rate of audio packet insertion between video packets is decided based on the audio and video sampling ratios. For example, if audio is digitally sampled as one tenth of video signal, then an audio packet may be introduced into the transport stream every ten video packets. The transport stream 900 may also contain, illustratively after every 64 packets, data packets that carry to the set top terminal overlay updates, raw data, HTML, java, URL, instructions to load other applications, user interaction routines, and the like. The data PIDs are assigned to different set of data packets related to guide portion slice sets and also video portion slice sets.

Figure 10:
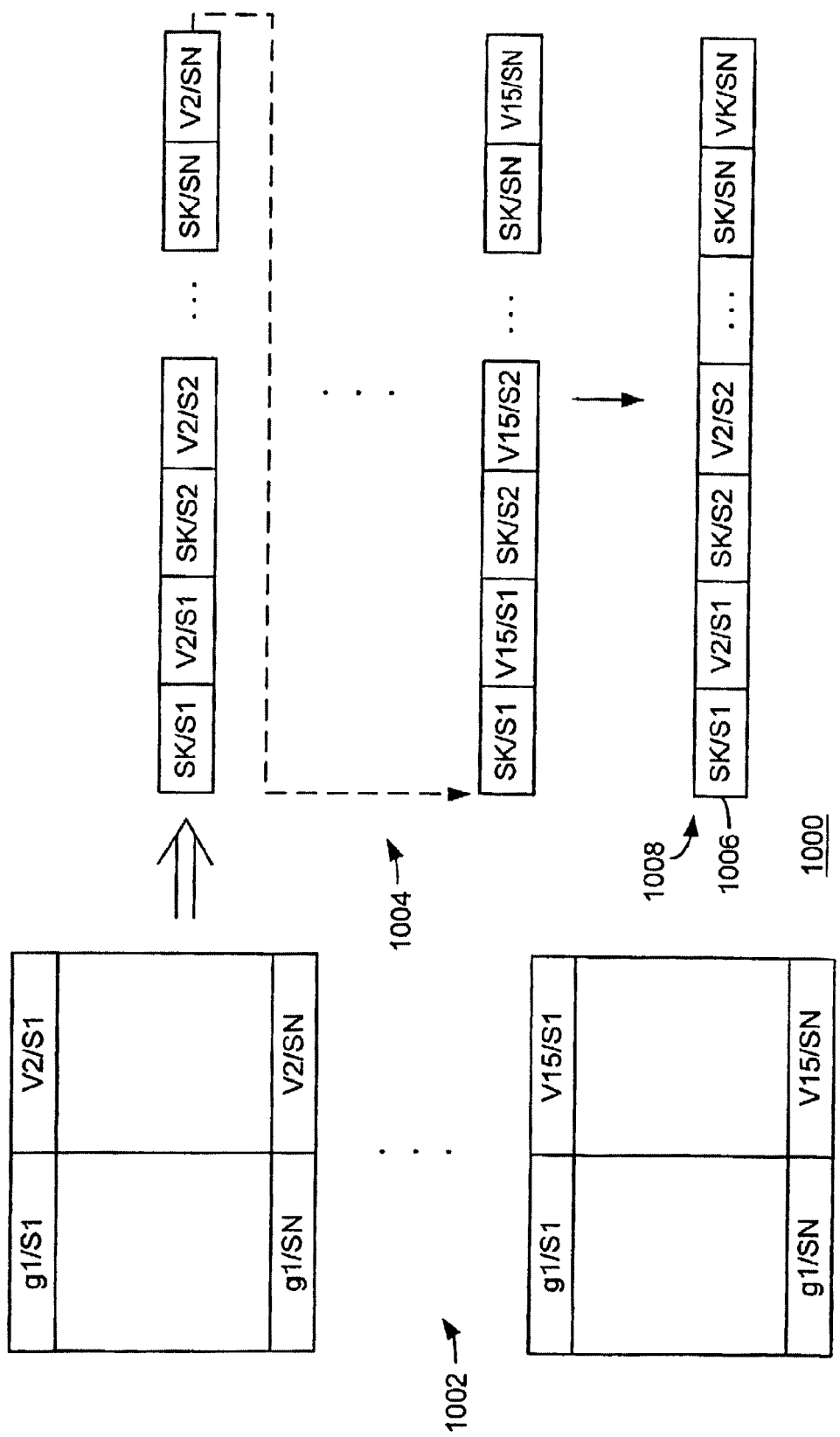
FIG. 10 is a diagrammatic flow diagram of a alternative process for generating a portion of transport stream containing predictive-coded video and graphics slices.

FIG. 10 illustrates a process 1000, an alternative embodiment of process 800 depicted in FIG. 8, for producing a predictive-coded slice bitstream 1006. The process 1000, at step 1002, produces the slice base encoded predictive-coded slices. At step 1004, the slices are scanned to intersperse the "skipped" slices (sk) with the video slices (v1). The previous embodiment scanned the skipped guide portion and video portion separately. In this embodiment, each slice is scanned left to right and top to bottom completely, including the skipped guide and video data. As such, at step 1008, the bitstream 1006 has the skipped guide and video slices distributed uniformly throughout the transport stream.

Figure 11A:
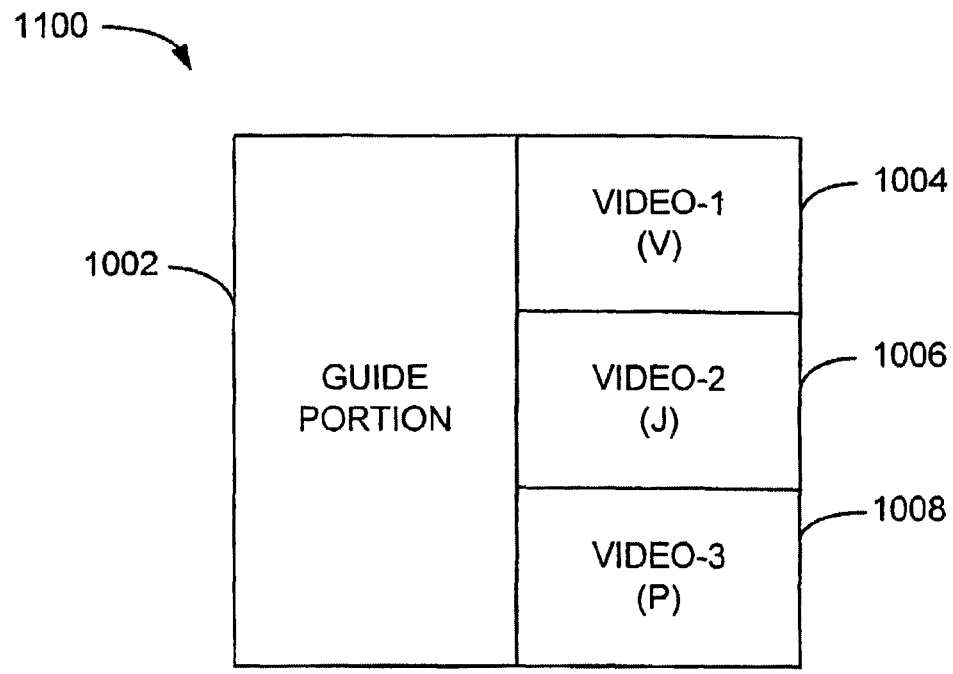
FIG. 11A depicts an illustration of an IPG having a graphics portion and a plurality of video portions.
Figure 11B:
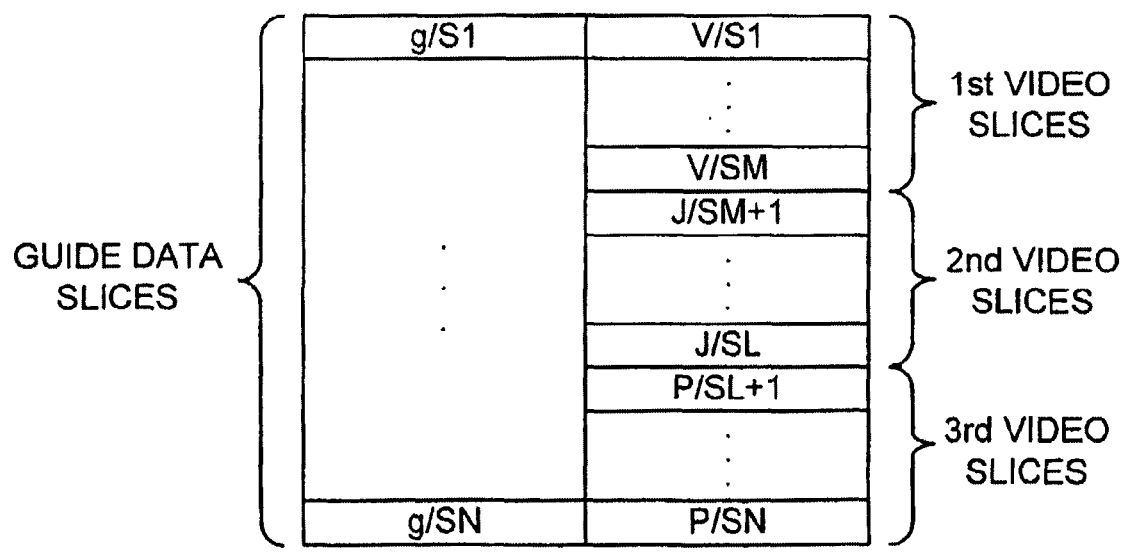
FIG. 11B depicts a slice map for the IPG of FIG. 11A.

The foregoing embodiments of the invention assumed that the IPG page was divided into one guide portion and one video portion. For example, in FIG. 1, the guide portion is the left half of the IPG page and the video portion is the right half of the IPG page. However, the invention can be extended to have a guide portion and multiple video portions, e.g., three. Each of the video portions may contain video having different rates of motion, e.g., portion one may run at 30 frames per second, portions two and three may run at 2 frames per second. FIG. 11A illustrates an exemplary embodiment of an IPG 1100 having a guide portion 1102 and three video portions 1104, 1106 and 1108. To encode such an IPG, each portion is separately encoded and assigned PIDs. FIG. 11B illustrates an assignment map for encoding each portion of the IPG page of FIG. 11A. The guide portion 1002 is encoded as slices g/s1 through g/sN, while the first video portion 1004 is encoded as slices v/s1 through v/sM, and the second video portion 1006 is encoded as slices j/sM+1 through j/sL, the third video portion 1008 is encoded as slices p/sL+1 through p/sN.

Figure 12:
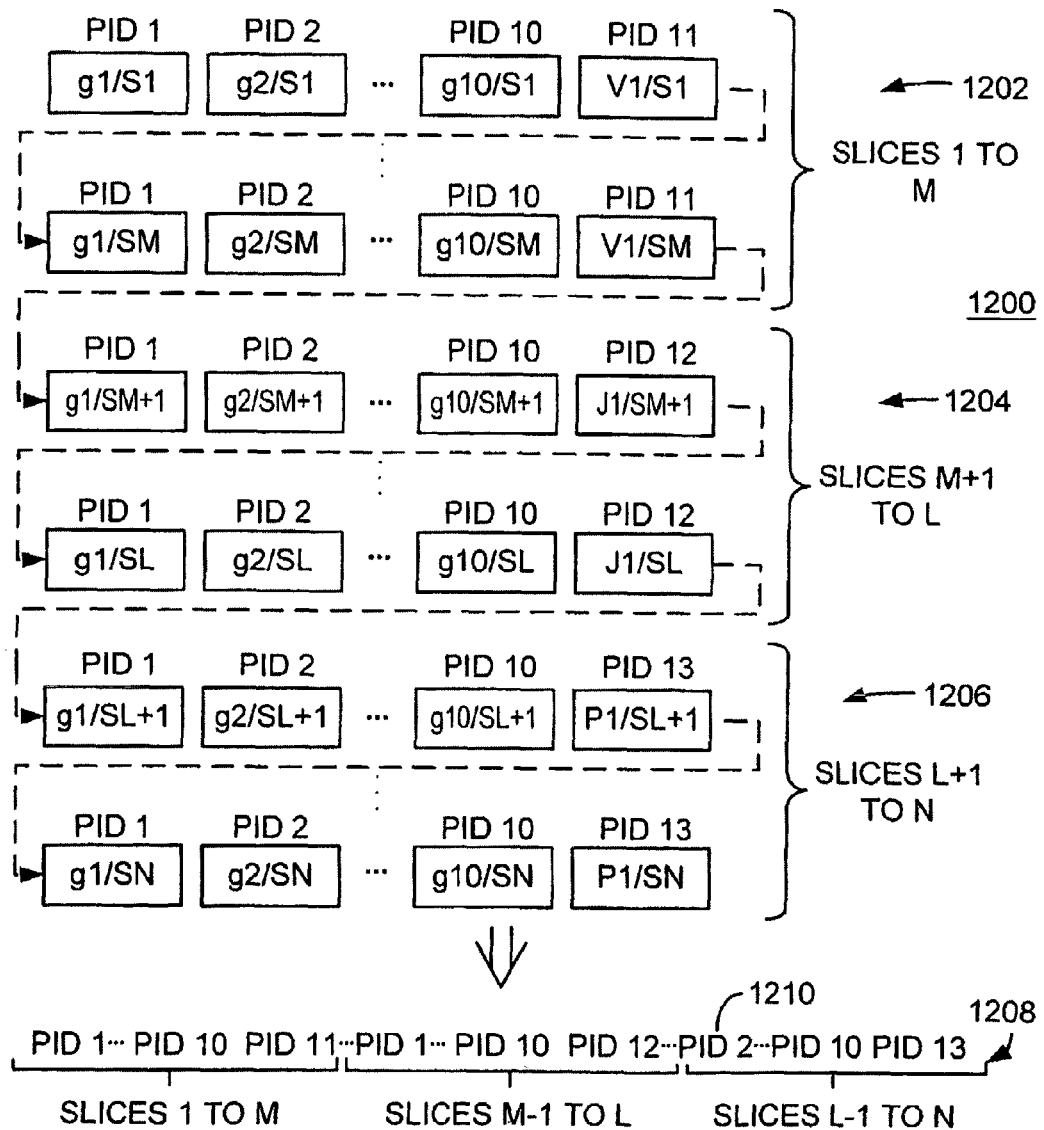
FIG. 12 is a diagrammatic flow diagram of a process for generating a portion of transport stream containing intra-coded video and graphics slices for an IPG having a graphics portion and a plurality of video portions.

FIG. 12 depicts the scanning process 1200 used to produce a bitstream 1210 containing the intra-coded slices. The scanning process 1200 flows from left to right, top to bottom through the assigned slices of FIG. 11B. PIDs are assigned, at step 1202, to slices 1 to M; at step 1204, to slices M+1 to L; and, at step 1206, to slices L+1 to N. As the encoded IPG is scanned, the PIDS are assigned to each of the slices. The guide portion slices are assigned PIDS 1 through 10, while the first video portion slices are assigned PID 11, the second video portion slices are assigned PID12 and the third video portion slices are assigned PID13. The resulting video portion of the bitstream 1210 contains the PIDS for slices 1–M, followed by PIDS for slices M+1 to L, and lastly by the PIDS for L+1 to N.

Figure 13:
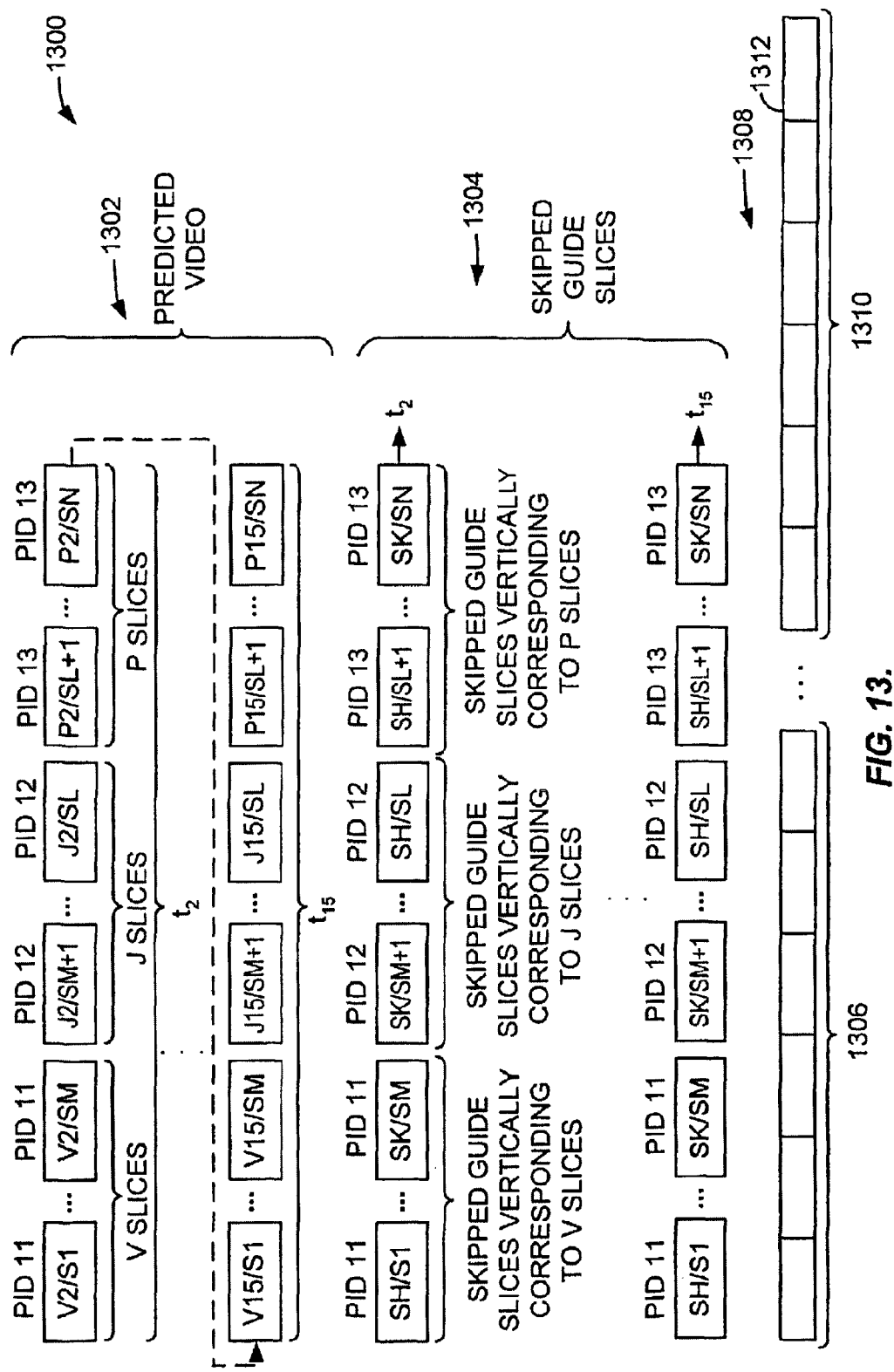
FIG. 13 is a diagrammatic flow diagram of a process for generating a portion of transport stream containing predictive-coded video and graphics slices for an IPG having a graphics portion and a plurality of video portions.

FIG. 13 depicts a diagrammatical illustration of a process 1300 for assigning PIDS to the predictive-coded slices for the IPG of FIG. 11A. The scanning process 1300 is performed, at step 1302, from left to right, top to bottom through the V, J and P predicted encoded slices and PIDS are assigned where the V slices are assigned PID11, the J slices are assigned PID 12 and the P slices are assigned PID13. After the video portion predicted encoded slices have assigned PIDs, the process 1300, at step 1304, assigns PIDs to the skipped slices. The skipped guide slices vertically corresponding to the V slices are assigned PID11, the skipped slices vertically corresponding to the J slices are assigned PID12 and the skipped slices vertically corresponding to the P slices are assigned PID13. At step 1308, the resulting predictive-coded bitstream 1312 comprises the predicted video slices in portion 1306 and the skipped slices 1310. The bitstream 1210 of intra-coded slices and the bitstream 1312 of predictive-coded slices are combined into a transport stream having a form similar to that depicted in FIG. 9.

To change pages in the guide, it is required to switch between programs (video PIDs for groups of slices) in a seamless manner. This cannot be done cleanly using a standard channel change by the receiver switching from PID to PID directly, because such an operation flushes the video and audio buffers and typically gives half a second blank screen.

To have seamless decoder switching, a splice countdown (or random access indicator) method is employed at the end of each video sequence to indicate the point at which the video should be switched from one PID to another.

Using the same profile and constant bit rate coding for the video and graphics encoding units, the generated streams for different IPG pages are formed in a similar length compared to each other. This is due to the fact that the source material is almost identical differing only in the characters in the guide from one page to another. In this way, while streams are generated having nearly identical lengths, the streams are not exactly the same length. For example, for any given sequence of 15 video frames, the number of transport packets in the sequence varies from one guide page to another. Thus, a finer adjustment is required to synchronize the beginnings and ends of each sequence across all guide pages in order for the countdown switching to work.

The invention provides the act of synchronization of a plurality of streams that provides seamless switching at the receiver.

Three methods are provided for that purpose:

First, for each sequence the multiplexer in the LNE identifies the length of the longest guide page for that particular sequence, and then adds sufficient null packets to the end of each other guide page so that all the guide pages become the same length. Then, the multiplexer adds the switching packets at the end of the sequence, after all the null packets.

The second method requires buffering of all the packets for all guide pages for each sequence. If this is allowed in the considered system, then the packets can be ordered in the transport stream such that the packets for each guide page appear at slightly higher or lower frequencies, so that they all finish at the same point. Then, the switching packets are added by the multiplexer in the LNE at the end of each stream without the null padding.

A third method is to start each sequence together, and then wait until all the packets for all the guide pages have been generated. Once the generation of all packets is completed, switching packets are placed in the streams at the same time and point in each stream.

Depending on the implementation of decoder units within the receiver and requirements of the considered application, each one of the methods can be applied with advantages. For example, the first method, which is null-padding, can be applied to avoid bursts of N packets of the same PID into a decoder's video buffer faster than the MPEG specified rate (e.g., 1.5 Mbit).

The teachings of the above three methods can be extended apply to similar synchronization problems and to derive similar methods for ensuring synchronization during stream switching.

E. Receiver 224

Figure 14:
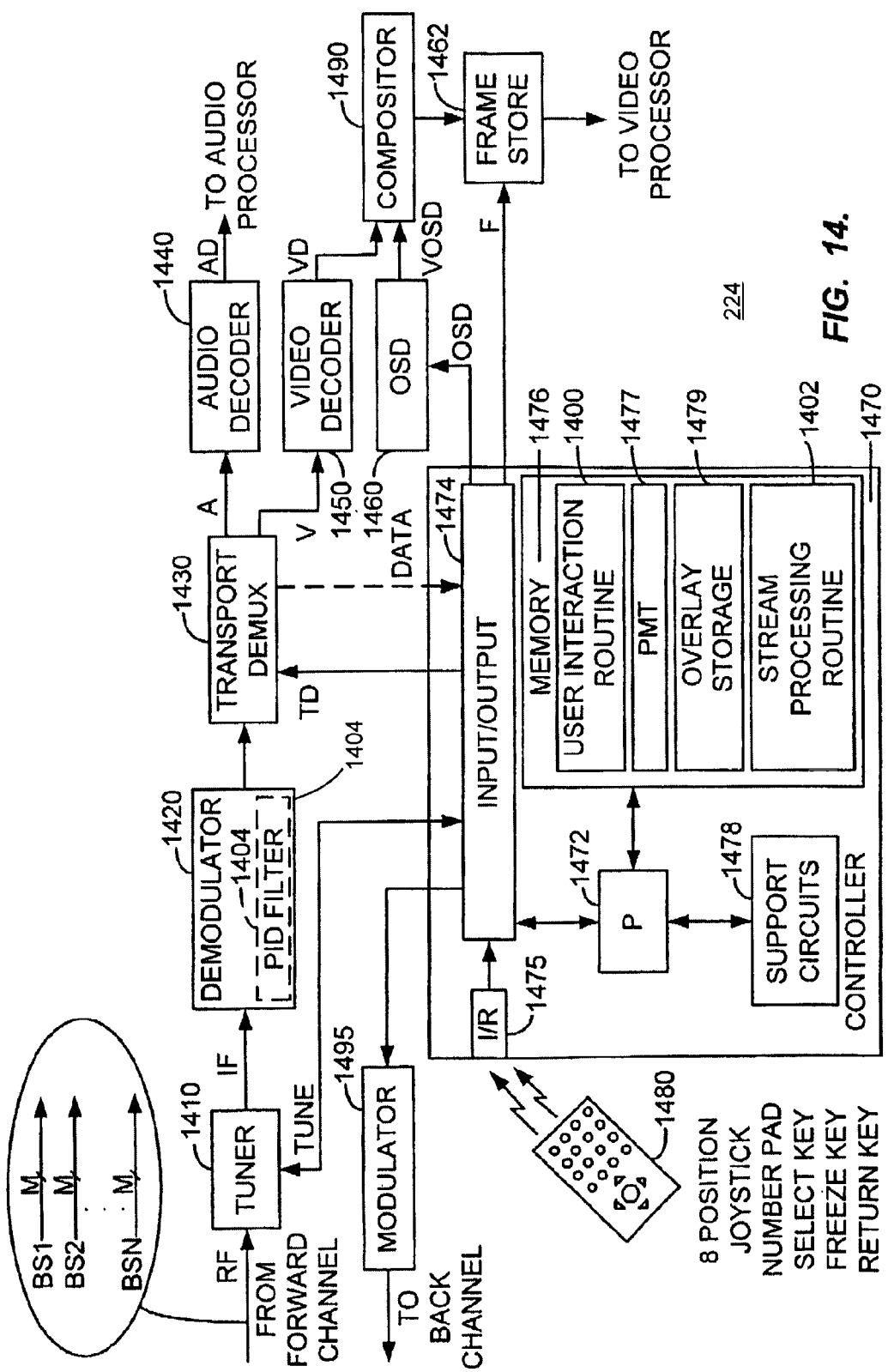
FIG. 14 depicts a block diagram of a receiver within subscriber equipment suitable for use in an interactive information distribution system.

FIG. 14 depicts a block diagram of the receiver 224 (also known as a set top terminal (STT) or user terminal) suitable for use in producing a display of an IPG in accordance with the present invention. The STT 224 comprises a tuner 1410, a demodulator 1420, a transport demultiplexer 1430, an audio decoder 1440, a video decoder 1450, an on-screen display processor (OSD) 1460, a frame store memory 1462, a video compositor 1490 and a controller 1470. User interaction is provided via a remote control unit 1480. Tuner 1410 receives, e.g., a radio frequency (RF) signal comprising, for example, a plurality of quadrature amplitude modulated (QAM) information signals from a downstream (forward) channel. Tuner 1410, in response to a control signal TUNE, tunes a particular one of the QAM information signals to produce an intermediate frequency (IF) information signal. Demodulator 1420 receives and demodulates the intermediate frequency QAM information signal to produce an information stream, illustratively an MPEG transport stream. The MPEG transport stream is coupled to a transport stream demultiplexer 1430.

Transport stream demultiplexer 1430, in response to a control signal TD produced by controller 1470, demultiplexes (i.e., extracts) an audio information stream A and a video information stream V. The audio information stream A is coupled to audio decoder 1440, which decodes the audio information stream and presents the decoded audio information stream to an audio processor (not shown) for subsequent presentation. The video stream V is coupled to the video decoder 1450, which decodes the compressed video stream V to produce an uncompressed video stream VD that is coupled to the video compositor 1490. OSD 1460, in response to a control signal OSD produced by controller 1470, produces a graphical overlay signal VOSD that is coupled to the video compositor 1490. During transitions between streams representing the user interfaces, buffers in the decoder are not reset. As such, the user interfaces seamlessly transition from one screen to another.

The video compositor 1490 merges the graphical overlay signal VOSD and the uncompressed video stream VD to produce a modified video stream (i.e., the underlying video images with the graphical overlay) that is coupled to the frame store unit 1462. The frame store unit 562 stores the modified video stream on a frame-by-frame basis according to the frame rate of the video stream. Frame store unit 562 provides the stored video frames to a video processor (not shown) for subsequent processing and presentation on a display device.

Controller 1470 comprises a microprocessor 1472, an input/output module 1474, a memory 1476, an infrared (IR) receiver 1475 and support circuitry 1478. The microprocessor 1472 cooperates with conventional support circuitry 1478 such as power supplies, clock circuits, cache memory and the like as well as circuits that assist in executing the software routines that are stored in memory 1476. The controller 1470 also contains input/output circuitry 1474 that forms an interface between the controller 1470 and the tuner 1410, the transport demultiplexer 1430, the onscreen display unit 1460, the back channel modulator 1495, and the remote control unit 1480. Although the controller 1470 is depicted as a general purpose computer that is programmed to perform specific interactive program guide control function in accordance with the present invention, the invention can be implemented in hardware as an application specific integrated circuit (ASIC). As such, the process steps described herein are intended to be broadly interpreted as being equivalently performed by software, hardware, or a combination thereof.

In the exemplary embodiment of FIG. 14, the remote control unit 1480 comprises an 8-position joy stick, a numeric pad, a "select" key, a "freeze" key and a "return" key. User manipulations of the joy stick or keys of the remote control device are transmitted to a controller via an infra red (IR) link. The controller 1470 is responsive to such user manipulations and executes related user interaction routines 1400, uses particular overlays that are available in an overlay storage 1479.

After the signal is tuned and demodulated, the video streams are recombined via stream processing routine 1402 to form the video sequences that were originally compressed. The processing unit 1402 employs a variety of methods to recombine the slice-based streams, including, using PID filter 1404, demultiplexer 1430, as discussed in the next sections of this disclosure of the invention. Note that the PID filter implemented illustratively as part of the demodulator is utilized to filter the undesired PIDs and retrieve the desired PIDs from the transport stream. The packets to be extracted and decoded to form a particular IPG are identified by a PID mapping table (PMT) 1477. After the stream processing unit 1402 has processed the streams into the correct order (assuming the correct order was not produced in the LNE), the slices are sent to the MPEG decoder 1450 to generate the original uncompressed IPG pages. If an exemplary transport stream with two PIDs as discussed in previous parts of the this disclosure, excluding data and audio streams, is received, then the purpose of the stream processing unit 1402 is to recombine the intra-coded slices with their corresponding predictive-coded slices in the correct order before the recombined streams are coupled to the video decoder. This complete process is implemented as software or hardware. In the illustrated IPG page slice structure, only one slice is assigned per row and each row is divided into two portions, therefore, each slice is divided into guide portion and video portion. In order for the receiving terminal to reconstruct the original video frames, one method is to construct a first row from its two slices in the correct order by retrieving two corresponding slices from the transport stream, then construct a second row from its two slices, and so on. For this purpose, a receiver is required to process two PIDs in a time period. The PID filter can be programmed to pass two desired PIDs and filter out the undesired PIDs. The desired PIDs are identified by the controller 1470 after the user selects an IPG page to review. A PID mapping table (1477 of FIG. 14) is accessed by the controller 1470 to identify which PIDS are associated with the desired IPG. If a PID filter is available in the receiver terminal, then it is utilized to receive two PIDs containing slices for guide and video portions. The demultiplexer then extracts packets from these two PIDs and couples the packets to the video decoder in the order in which they arrived. If the receiver does not have an optional PID filter, then the demultiplexer performs the two PID filtering and extracting functions. Depending on the preferred receiver implementation, the following methods are provided in FIGS. 15-18 to recombine and decode slice-based streams.

E1. Recombination Method 1

In this first method, intra-coded slice-based streams (I-streams) and the predictive-coded slice-based streams (PRED streams) to be recombined keep their separate PID's until the point where they must be depacketized. The recombination process is conducted within the demultiplexer 1430 of the subscriber equipment For illustrative purposes, assuming a multi-program transport stream with each program consisting of I-PIDs for each intra-coded guide slice, I-PIDs for the intra-coded video slices, one PRED-PID for predicted guide and video, an audio-PID, and multiple data-PIDs, any packet with a PID that matches any of the PID's within the desired program (as identified in a program mapping table) are depacketized and the payload is sent to the elementary stream video decoder. Payloads are sent to the decoder in exactly in the order in which the packets arrive at the demultiplexer.

Figure 15:
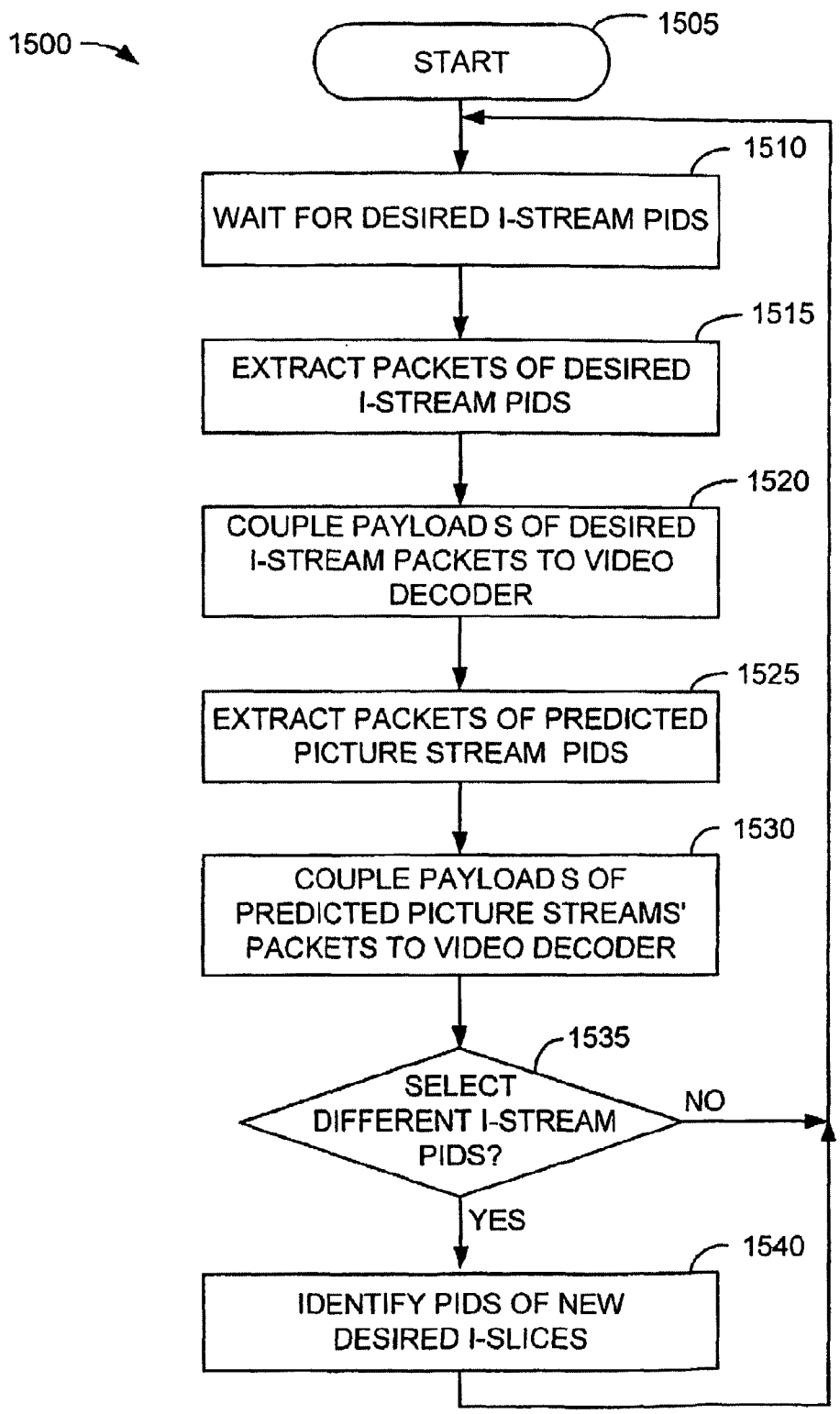
FIG. 15 depicts a flow diagram of a first embodiment of a slice recombination process.

FIG. 15 is a flow diagram of the first packet extraction method 1500. The method starts at step 1505 and proceeds to step 1510 to wait for (user) selection of an I-PID to be received. The I-PID, as the first picture of a stream's GOP, represents the stream to be received. However, since the slice-based encoding technique assigns two or more I-PIDS to the stream (i.e., I-PIDs for the guide portion and for one or more video portions), the method must identify two or more I-PIDs. Upon detecting a transport packet having the selected I-PIDs, the method 1500 proceeds to step 1515.

At step 1515, the I-PID packets (e.g., packets having PID-1 and PID-11) are extracted from the transport stream, including the header information and data, until the next picture start code. The header information within the first-received I-PID access unit includes sequence header, sequence extension, group start code, GOP header, picture header, and picture extension, which are known to a reader that is skilled in MPEG-1 and MPEG-2 compression standards. The header information in the next I-PID access units that belongs to the second and later GOP's includes group start code, picture start code, picture header, and extension. The method 1500 then proceeds to step 1520 where the payloads of the packets that includes header information related to video stream and I-picture data are coupled to the video decoder 1550 as video information stream V. The method 1500 then proceeds to step 1525.

At step 1525, the predicted picture slice-based stream packets PRED-PID, illustratively the PID-11 packets of fourteen predicted pictures in a GOP of size fifteen, are extracted from the transport stream. At step 1530, the payloads of the packets that includes header information related to video stream and predicted-picture data are coupled to the video decoder 1550 as video information stream V. At the end of step 1530, a complete GOP, including the I-picture and the predicted-picture slices, are available to the video decoder 1550. As the payloads are sent to the decoder in exactly in the order in which the packets arrive at the demultiplexer, the video decoder decodes the recombined stream with no additional recombination process. The method 1500 then proceeds to step 1535.

At step 1535, a query is made as to whether a different I-PID is requested, e.g., new IPG is selected. If the query at step 1535 is answered negatively, then the method 1500 proceeds to step 1510 where the transport demultiplexer 1530 waits for the next packets having the PID of the desired I-picture slices. If the query at step 1535 is answered affirmatively, then the PID of the new desired I-picture slices is identified at step 1540 and the method 1500 returns to step 1510.

The method 1500 of FIG. 15 is used to produce a conformant MPEG video stream V by concatenating a desired I-picture slices and a plurality of P- and/or B-picture slices forming a pre-defined GOP structure.

E2. Recombination Method 2

The second method of recombining the video stream involves the modification of the transport stream using a PID filter. A PID filter 1404 can be implemented as part of the demodulator 1420 of FIG. 14 or as part of demultiplexer.

For illustrative purposes, assuming a multi-program transport stream with each program consisting of an I-PIDs for both video and guide, PRED-PID for both video and guide, audio-PID, and data-PID, any packet with a PID that matches any of the PIDs within the desired program as identified by the program mapping table to be received have its PID modified to the lowest video PID in the program (the PID which is referenced first in the program's program mapping table (PMT)). For example, in a program, assuming that a guide slice I-PID is 50, the video slice I-PID is 51 and PRED-PID is 52. Then, the PID-filter modifies the video I-PID and the PRED-PID as 50 and thereby, I- and Predicted-Picture slice access units attain the same PID number and become a portion of a common stream.

As a result, the transport stream output from the PID filter contains a program with a single video stream, whose packets appear in the proper order to be decoded as valid MPEG bitstream.

Note that the incoming bit stream does not necessarily contain any packets with a PID equal to the lowest video PID referenced in the programs PMT. Also note that it is possible to modify the video PID's to other PID numbers than lowest PID without changing the operation of the algorithm.

When the PID's of incoming packets are modified to match the PID's of other packets in the transport stream, the continuity counters of the merged PID's may become invalid at the merge points, due to each PID having its own continuity counter. For this reason, the discontinuity indicator in the adaptation field is set for any packets that may immediately follow a merge point. Any decoder components that check the continuity counter for continuity is required to correctly process the discontinuity indicator bit.

Figure 16:
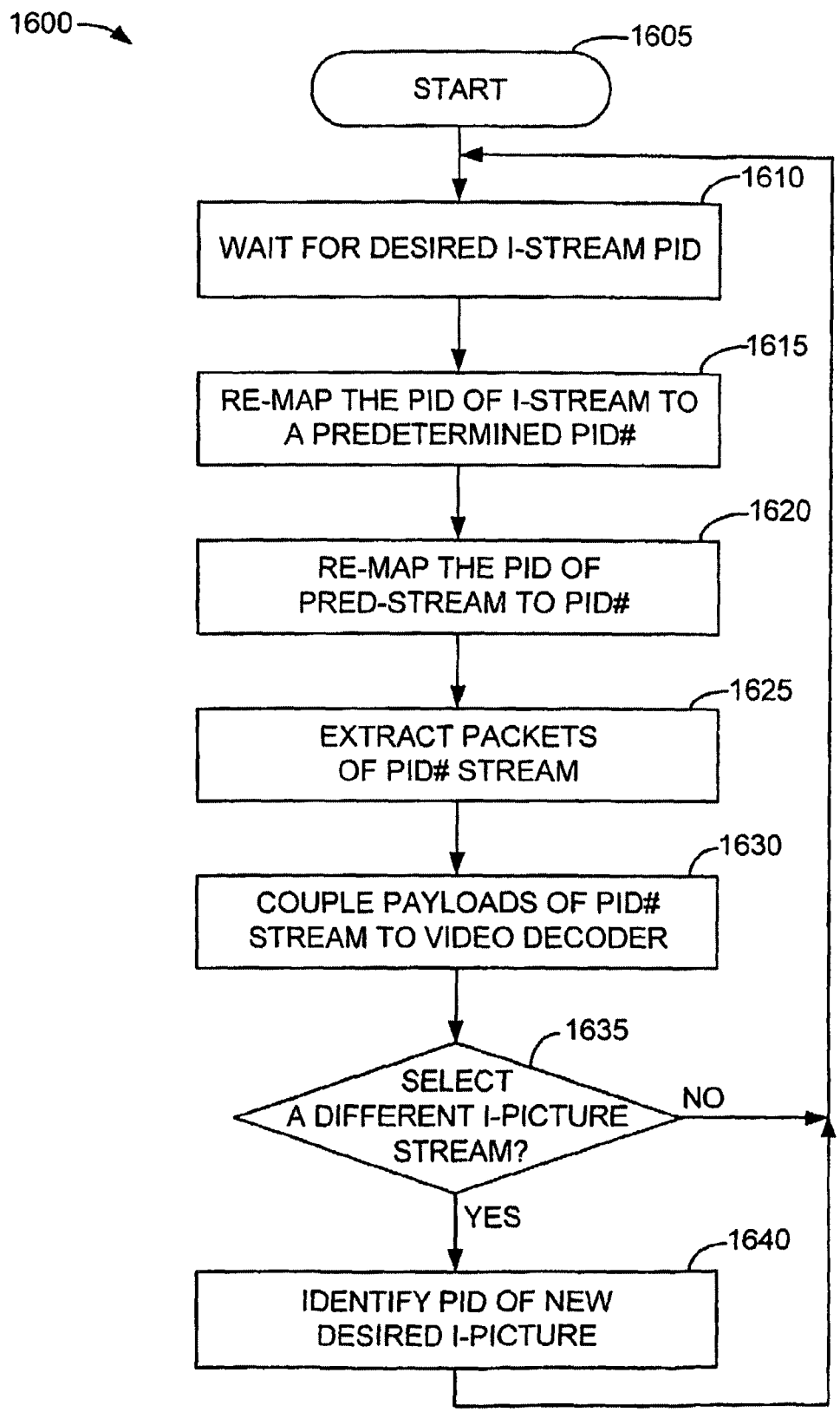
FIG. 16 depicts a flow diagram of a second embodiment of a slice recombination process.

FIG. 16 illustrates the details of this method, in which, it starts at step 1605 and proceeds to step 1610 to wait for (user) selection of two I-PIDs, illustratively two PIDs corresponding to guide and video portion slices, to be received. The I-PIDs, comprising the first picture of a stream's GOP, represents the two streams to be received. Upon detecting a transport packet having one of the selected I-PIDs, the method 1600 proceeds to step 1615.

At step 1615, the PID number of the I-stream is re-mapped to a predetermined number, PID*. At this step, the PID filter modifies all the PID's of the desired I-stream packets to PID*. The method then proceeds to step 1620, wherein the PID number of the predicted picture slice streams, PRED-PID, is remapped to PID*. At this step, the PID filter modifies all the PID's of the PRED-PID packets to PID*. The method 1600 then proceeds to step 1625.

At step 1625, the packets of the PID* stream are extracted from the transport stream by the demultiplexer. The method 1600 then proceeds to step 1630, where the payloads of the packets that includes video stream header information and I-picture and predicted picture slices are coupled to the video decoder as video information stream V. Note that the slice packets are ordered in the transport stream in the same order as they are to be decoded, i.e., a guide slice packets of first row followed by video slice packets of first row, second row, and so on. The method 1600 then proceeds to 1635.

At step 1635, a query is made as to whether a different set of (two) I-PIDs are requested. If the query at step 1635 is answered negatively, then the method 1600 proceeds to step 1610 where the transport demultiplexer waits for the next packets having the identified I-PIDs. If the query at step 1635 is answered affirmatively, then the two PIDs of the new desired I-picture is identified at step 1640 and the method 1600 returns to step 1610.

The method 1600 of FIG. 16 is used to produce a conformant MPEG video stream by merging the intra-coded slice streams and predictive-coded slice streams before the demultiplexing process.

E3. Recombination Method 3

The third method accomplishes MPEG bitstream recombination by using splicing information in the adaptation field of the transport packet headers by switching between video PIDs based on splice countdown concept.

In this method, the MPEG streams signal the PID to PID switch points using the splice countdown field in the transport packet header's adaptation field. When the PID filter is programmed to receive one of the PIDs in a program's PMT, the reception of a packet containing a splice countdown value of 0 in its header's adaptation field causes immediate reprogramming of the PID filter to receive the other video PID. Note that a special attention to splicing syntax is required in systems where splicing is used also for other purposes.

Figure 17:
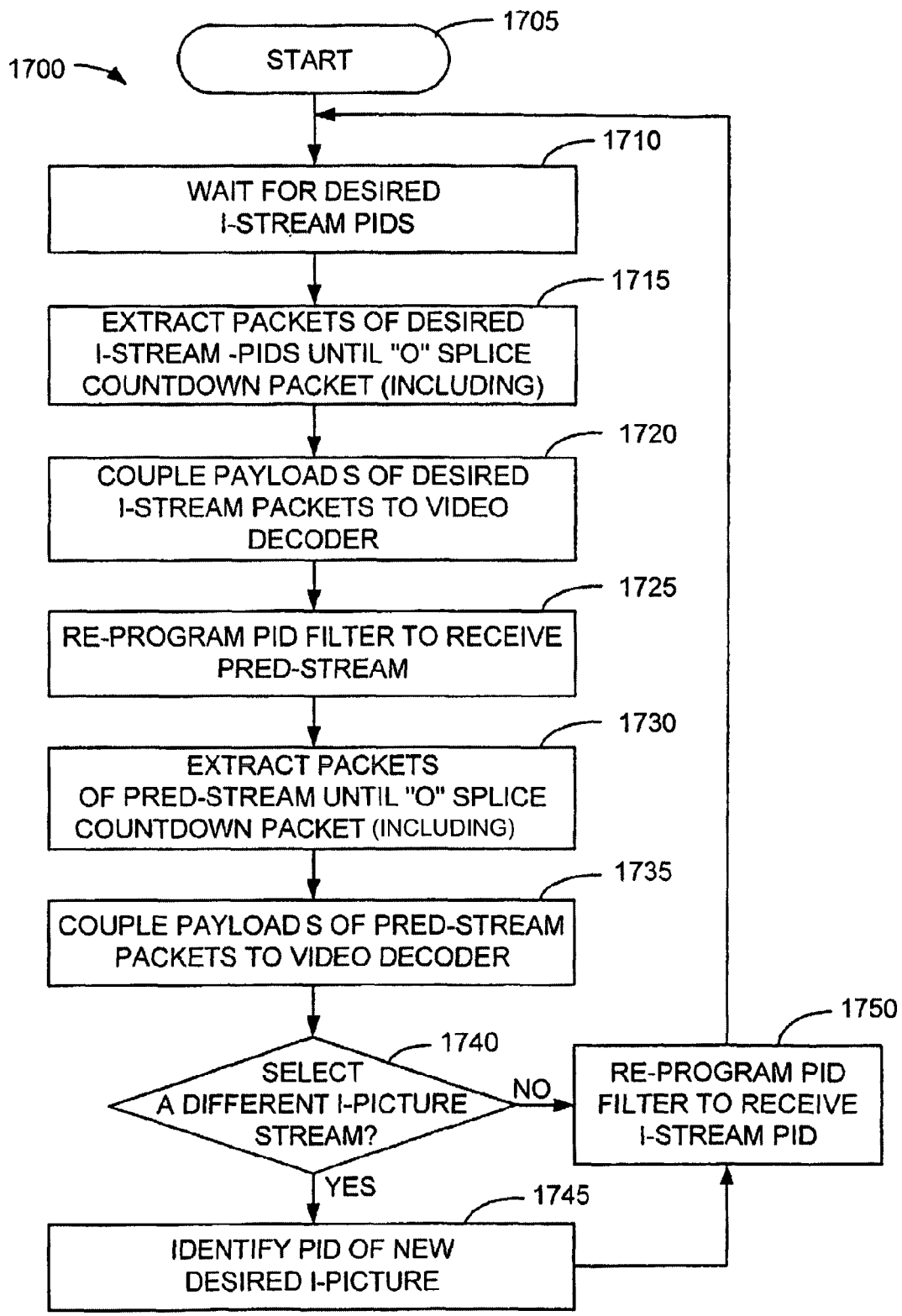
FIG. 17 depicts a flow diagram of a third embodiment of a slice recombination process.

FIG. 17 illustrates the details of this method, in which, it starts at step 1705 and proceeds to step 1710 to wait for (user) selection of two I-PIDs to be received. The I-PIDs, comprising the first picture of a stream's GOP, represents the stream to be received. Upon detecting a transport packet having one of the selected I-PIDs, the method 1700 proceeds to step 1715.

At step 1715, the I-PID packets are extracted from the transport stream until, and including, the I-PID packet with slice countdown value of zero. The method 1700 then proceeds to step 1720 where the payloads of the packets that includes header information related to video stream and I-picture slice data are coupled to the video decoder as video information stream V. The method 1700 then proceeds to step 1725.

At step 1725, the PID filter is re-programmed to receive the predicted picture packets PRED-PID. The method 1700 then proceeds to 1730. At step 1730, the predicted stream packets, illustratively the PID11 packets of predicted picture slices, are extracted from the transport stream. At step 1735, the payloads of the packets that includes header information related to video stream and predicted-picture data are coupled to the video decoder. At the end of step 1735, a complete GOP, including the I-picture slices and the predicted-picture slices, are available to the video decoder. As the payloads are sent to the decoder in exactly in the order in which the packets arrive at the demultiplexer, the video decoder decodes the recombined stream with no additional recombination process. The method 1700 then proceeds to step 1740.

At step 1740, a query is made as to whether a different I-PID set (two) is requested. If the query at step 1740 is answered negatively, then the method 1700 proceeds to step 1750 where the PID filter is re-programmed to receive the previous desired I-PIDs. If answered affirmatively, then the PIDs of the new desired I-picture is identified at step 1745 and the method proceeds to step 1750, where the PID filter is re-programmed to receive the new desired I-PIDs. The method then proceeds to step 1745, where the transport demultiplexer waits for the next packets having the PIDs of the desired I-picture.

The method 1700 of FIG. 17 is used to produce a conformant MPEG video stream, where the PID to PID switch is performed based on a splice countdown concept. Note that the slice recombination can also be performed by using the second method where the demultiplexer handles the receiving PIDs and extraction of the packets from the transport stream based on the splice countdown concept. In this case, the same process is applied as FIG. 17 with the difference that instead of reprogramming the PID filter after "0" splice countdown packet, the demultiplexer is programmed to depacketize the desired PIDs.

E4. Recombination Method 4

For the receiving systems that do not include a PID filter and for those receiving systems in which the demultiplexer can not process two PIDs for splicing the streams, a fourth method presented herein provides the stream recombination. In a receiver that cannot process two PIDs, two or more streams with different PIDs are spliced together via an additional splicing software or hardware and can be implemented as part of the demultiplexer. The process is described below with respect to FIG. 18. The algorithm provides the information to the demultiplexer about which PID to be spliced to as the next step. The demultiplexer processes only one PID but a different PID after the splice occurs.

Figure 18:
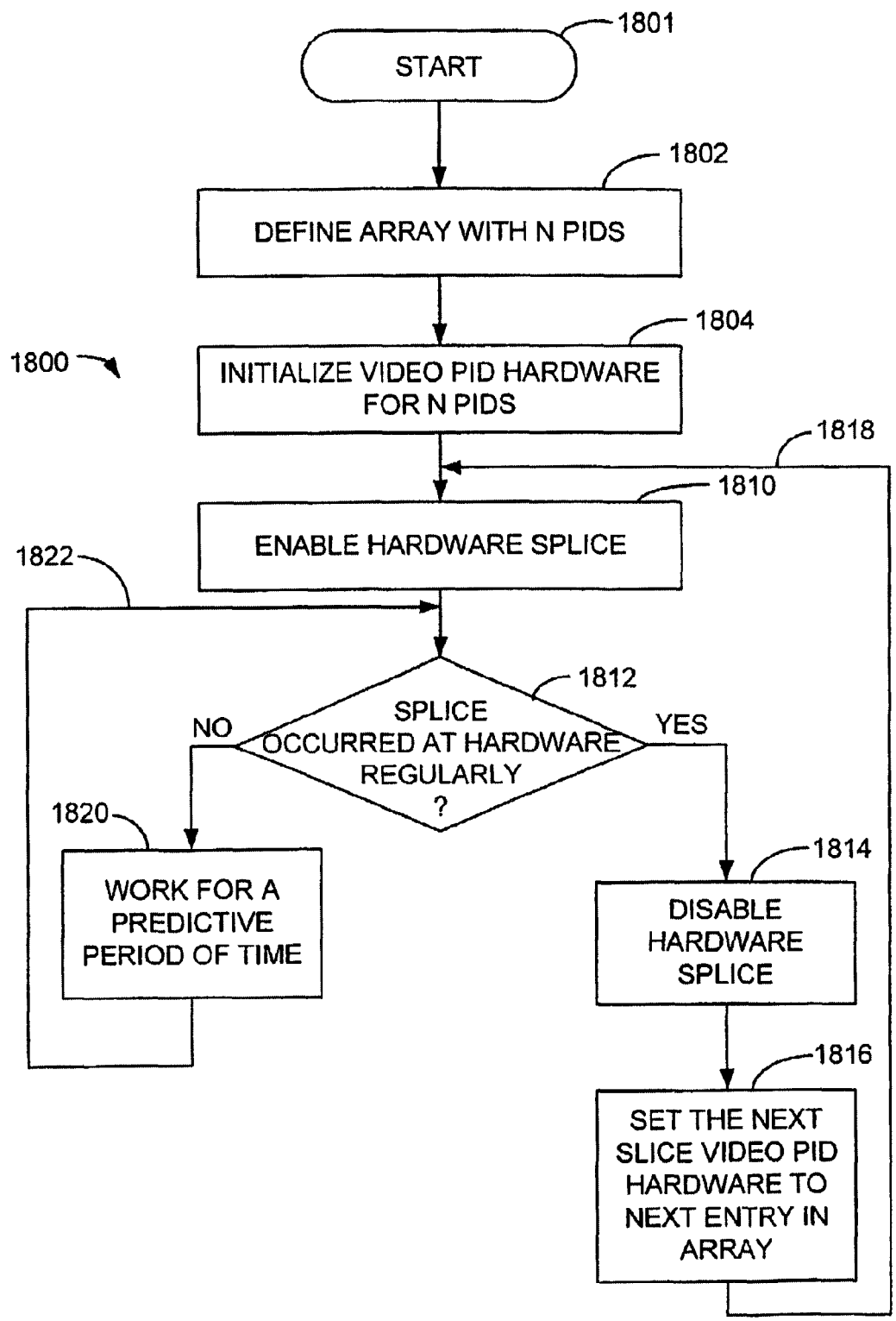
FIG. 18 depicts a flow diagram of a fourth embodiment of a slice recombination process.

FIG. 18 depicts a flow diagram of this fourth process 1800 for recombining the IPG streams. The process 1800 begins at step 1801 and proceeds to step 1802 wherein the process defines an array of elements having a size that is equal to the number of expected PIDs to be spliced. It is possible to distribute splice information in a picture as desired according to slice structure of the picture and the desired processing form at the receiver. For example, in the slice based streams discussed in this invention, for an I picture, splice information may be inserted into slice row portions of guide and video data. At step 1804, the process initializes the video PID hardware with for each entry in the array. At step 1810, the hardware splice process is enabled and the packets are extracted by the demultiplexer. The packet extraction may also be performed at another step within the demultiplexer. At step 1812, the process checks a hardware register to determine if a splice has been completed. If the splice has occurred, the process, at step 1814, disables the splice hardware and, at step 1816, sets the video PID hardware to the next entry in the array. The process then returns along path 1818 to step 1810. If the splice has not occurred, the process proceeds to step 1820 wherein the process waits for a period of time and then returns along path 1822 to step 1812.

In this manner, the slices are spliced together by the hardware within the receiver. To facilitate recombining the slices, the receiver is sent an array of valid PID values for recombining the slices through a user data in the transport stream or another communications link to the STT from the HEE. The array is updated dynamically to ensure that the correct portions of the IPG are presented to the user correctly. Since the splice points in slice based streams may occur at a frequent level, a software application may not have the capability to control the hardware for splicing operation as discussed above. If this is the case, then, firmware is dedicated to control the demodulator hardware for splicing process at a higher rate than a software application can handle.

F. Example: Interactive Program Guide

The video streams representing the IPG may be carried in a single transport stream or multiple transport streams, within the form of a single or multi-programs as discussed below with respect to the description of the encoding system. A user desiring to view the next 1.5 hour time interval (e.g., 9:30-11:00) may activate a "scroll right" object (or move the joystick to the right when a program within program grid occupies the final displayed time interval). Such activation results in the controller of the STT noting that a new time interval is desired. The video stream corresponding to the new time interval is then decoded and displayed. If the corresponding video stream is within the same transport stream (i.e., a new PID), then the stream is immediately decoded and presented. If the corresponding video stream is within a different transport stream, then the related transport stream is extracted from the broadcast stream and the related video stream is decoded and presented. If the corresponding transport stream is within a different broadcast stream, then the related broadcast stream is tuned, the corresponding transport stream is extracted, and the desired video stream is decoded and presented.

It is important to note that each extracted video stream is associated with a common audio stream. Thus, the video/audio barker function of the program guide is continuously provided, regardless of the selected video stream. Also note that the teachings of the invention is equally applicable to systems and user interfaces that employs multiple audio streams.

Similarly, a user interaction resulting in a prior time interval or a different set of channels results in the retrieval and presentation of a related video stream. If the related video stream is not part of the broadcast video streams, then a pointcast session is initiated. For this purpose, the STT sends a request to the head end via the back channel requesting a particular stream. The head end then processes the request, retrieves the related guide and video streams from the information server, incorporates the streams within a transport stream as discussed above (preferably, the transport stream currently being tuned/selected by the STT) and informs the STT which PIDs should be received, and from which transport stream should be demultiplexed. The STT then extracts the related PIDs for the IPG. In the case of the PID being within a different transport stream, the STT first demultiplexes the corresponding transport stream (possibly tuning a different QAM stream within the forward channel).

Upon completion of the viewing of the desired stream, the STT indicates to the head end that it no longer needs the stream, whereupon the head end tears down the pointcast session. The viewer is then returned to the broadcast stream from which the pointcast session was launched.

Although various embodiments which incorporate the teachings of the present invention have been shown and described in detail herein, those skilled in the art can readily devise many other varied embodiments that still incorporate these teachings. An important note is that the method and apparatus described herein is applicable to any number of slice assignments to a video frame and any type of slice structures. The presented algorithms are also applicable to any number of PID assignments to intra-coded and predictive-coded slice based streams. For example, multiple PIDs can be assigned to the predictive-coded slices without loss of generality. Also note that the method and apparatus described herein is fully applicable picture based encoding by assigning each picture only to a one slice, where each picture is encoded then as a full frame instead of multiple slices.

G. Multi-Functional User Interface with Picture-in-Picture Functionality

One aspect of the present invention relates to providing picture-in-picture (PIP) functionality using slice-based encoding. The PIP functionality supplies multiple (instead of singular) video content. The present invention also relates to providing an additional user interface (UI) layer on top (presented to the viewer as an initial screen) of the interactive program guide (IPG). The additional UI layer extends the functionality of the IPG from a programming guide to a multi-functional user interface. The multi-functional user interface may be used to provide portal functionality to such applications as electronic commerce, advertisement, video-on-demand, and other applications.

A matrix representation of IPG data with single video content is described above in relation to FIG. 6. As shown in FIG. 6, single video content, including time-sequenced video frames V1 to V15, is shared among multiple guide pages g1 to g10. A diagrammatic flow of a slice-based process for generating a portion of the transport stream containing intra-coded video and graphics slices is described above in relation to FIG. 7. As described below, slice-based encoding may also be used to provide picture-in-picture (PIP) functionality and a multi-functional user interface.

Figure 19:
FIG. 19 is a schematic diagram illustrating slice-based formation of an intra-coded portion of a stream of packets including multiple intra-coded guide pages and multiple intra-coded video signals in accordance with an embodiment of this invention.

FIG. 19 is a schematic diagram illustrating slice-based formation of an intra-coded portion of a stream of packets 1900 including multiple intra-coded guide pages and multiple intra-coded video frames in accordance with an embodiment of this invention. The intra-coded video frames generally occur at a first frame of a group of pictures (GOP). Hence, the schematic diagram in FIG. 19 is denoted as corresponding to time t1.

In the example illustrated in FIG. 19, packet identifiers (PIDs) 1 through 10 are assigned to ten program guide pages (g1 through g10), and PIDs 11 through 13 are assigned to three video streams (V1, M1, and K1). Each guide page is divided into N slices S1 to SN, each slice extending from left to right of a row. Likewise, each intra-coded video frame is divided into N slices s1 to sN.

As shown in FIG. 19, one way to form a stream of packets is to scan guide and video portion slices serially. In other words, packets from the first slice (s1) are included first, then packets from the second slice (s2) are included second, then packets from the third slice (s3) are included third, and so on until packets from the Nth slice (sN) are included last, where within each slice grouping, packets from the guide graphics are included in serial order (g1 to g10), then packets from the intra-coded video slices are included in order (V1, M1, K1). Hence, the stream of packets are included in the order illustrated in FIG. 19.

Figure 20:
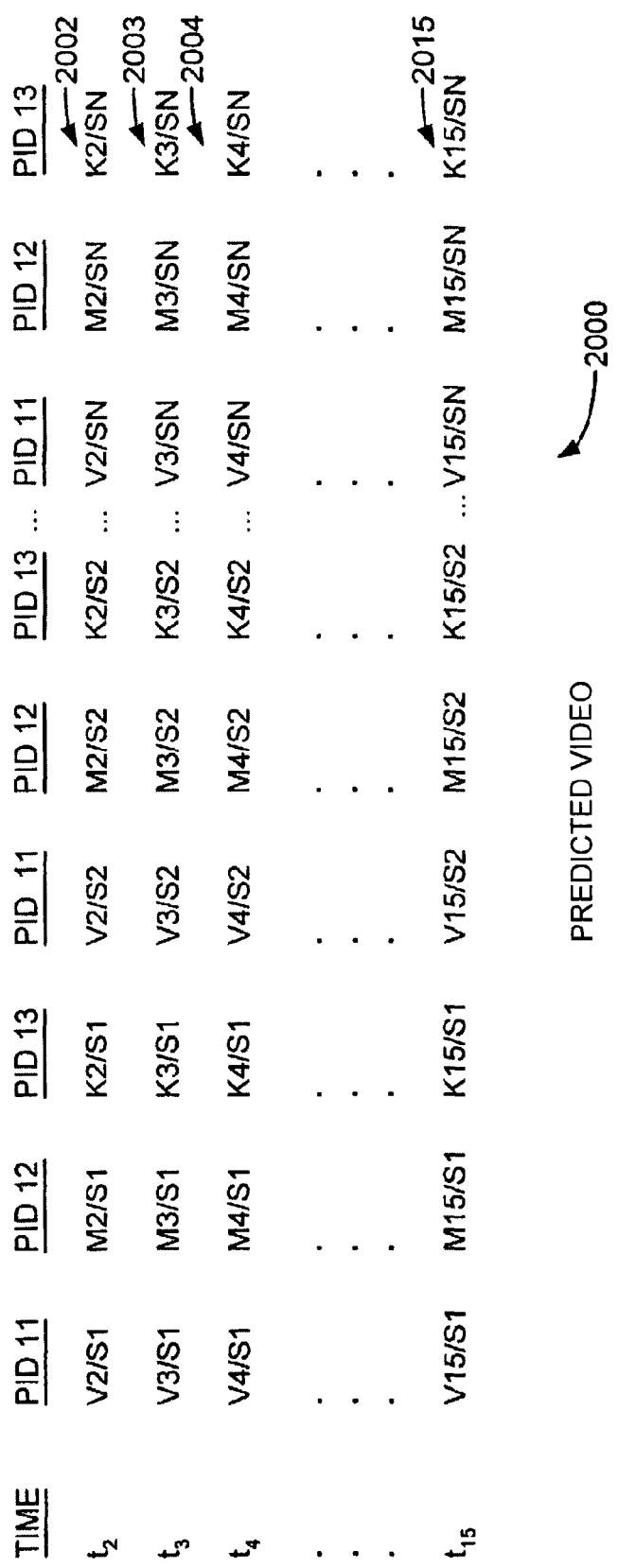
FIG. 20 is a schematic diagram illustrating slice-based formation of a video portion of predictive-coded stream of packets including multiple predictive-coded video signals in accordance with an embodiment of this invention.

FIG. 20 is a schematic diagram illustrating slice-based formation of predictive-coded portion of multiple video stream packets in accordance with an embodiment of this invention. The predictive-coded video frames (either predicted P or bidirectional B frames in MPEG2) generally occur after the first frame of a group of pictures (GOP). For FIG. 20, it is assumed that the GOP has 15 frames. Hence, the schematic diagram in FIG. 20 is denoted as corresponding to times t2 to t15.

In the example illustrated in FIG. 20, PIDs 11 through 13 are assigned to three video streams (V1, M1, and K1), each predictive-coded video frame of each video stream being divided into N slices s1 to sN.

As shown in FIG. 20, one way to form a stream of packets is to scan serially from the time t2 through tN. In other words, packets 2002 from the second time (t2) are included first, then packets 2003 from the third time (t3) are included second, then packets 2004 from the fourth time (t4) are included third, and so on until packets 2015 from the fifteenth time (t15) are included last. Within each time, packets of predictive-coded video frames from each video stream are grouped together by slice (S1 through S15). Within each slice grouping, the packets are ordered with the packet corresponding to the slice for video stream V as first, the packet corresponding to the slice for video stream M as second, and the packet corresponding to the slice for video stream K as third. Hence, the stream of packets are included in the order illustrated in FIG. 20.

Figure 21:
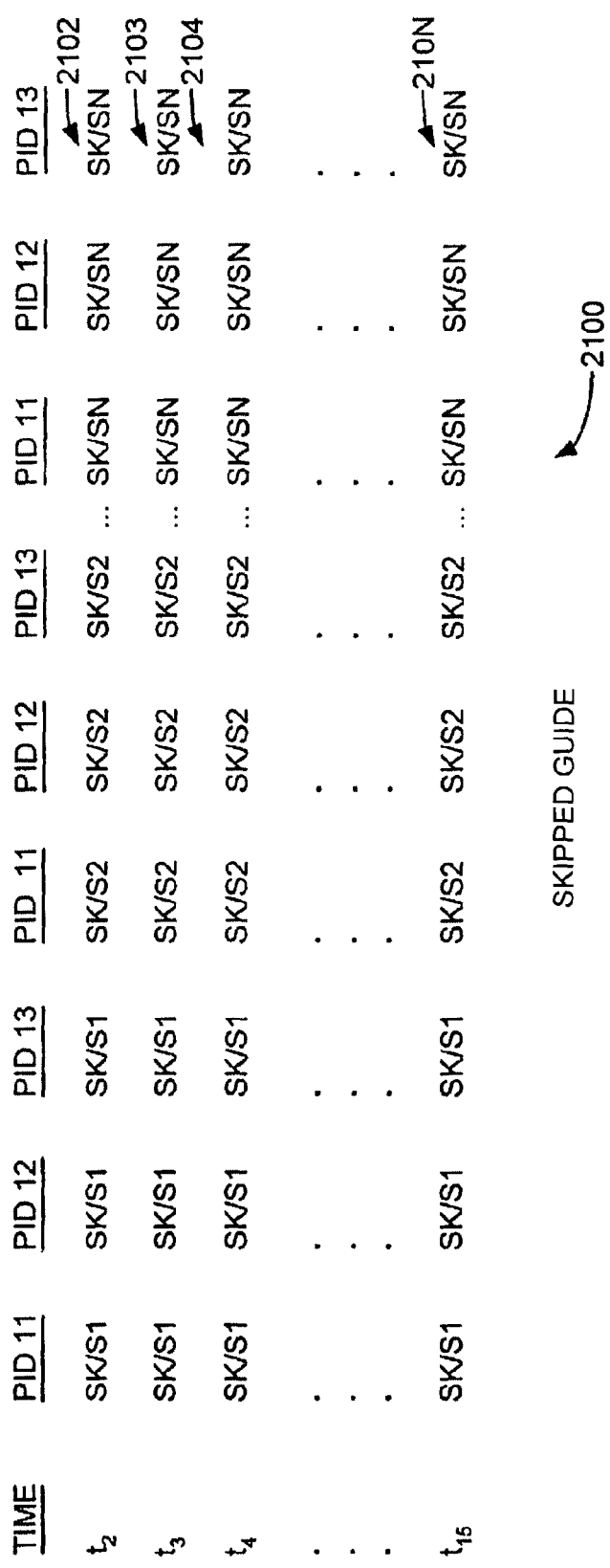
FIG. 21 is a schematic diagram illustrating slice-based formation of a guide portion of predictive-coded stream of packets including skipped guide pages in accordance with an embodiment of this invention.

FIG. 21 is a schematic diagram illustrating slice-based formation of a stream of packets including skipped guide pages in accordance with an embodiment of this invention. The formation of the stream of packets in FIG. 21 is similar to the formation of the stream of packets in FIG. 20. However, the skipped guide page content (SK) is the same for each slice and for each video stream. In contrast, the predictive-coded video frames are different for each slice and for each video stream.

In accordance with an embodiment of the present invention, for each time t2 through t15, the packets containing the skipped guide pages follow the corresponding packets containing the predictive-coded video frames. For example, for time t2, the first row of skipped guide packets 2102 follow the first row of predictive-coded packets 2002. For time t3, the second row of skipped guide packets 2103 follow the second row of predictive-coded packets 2003. And so on.

Figure 22:
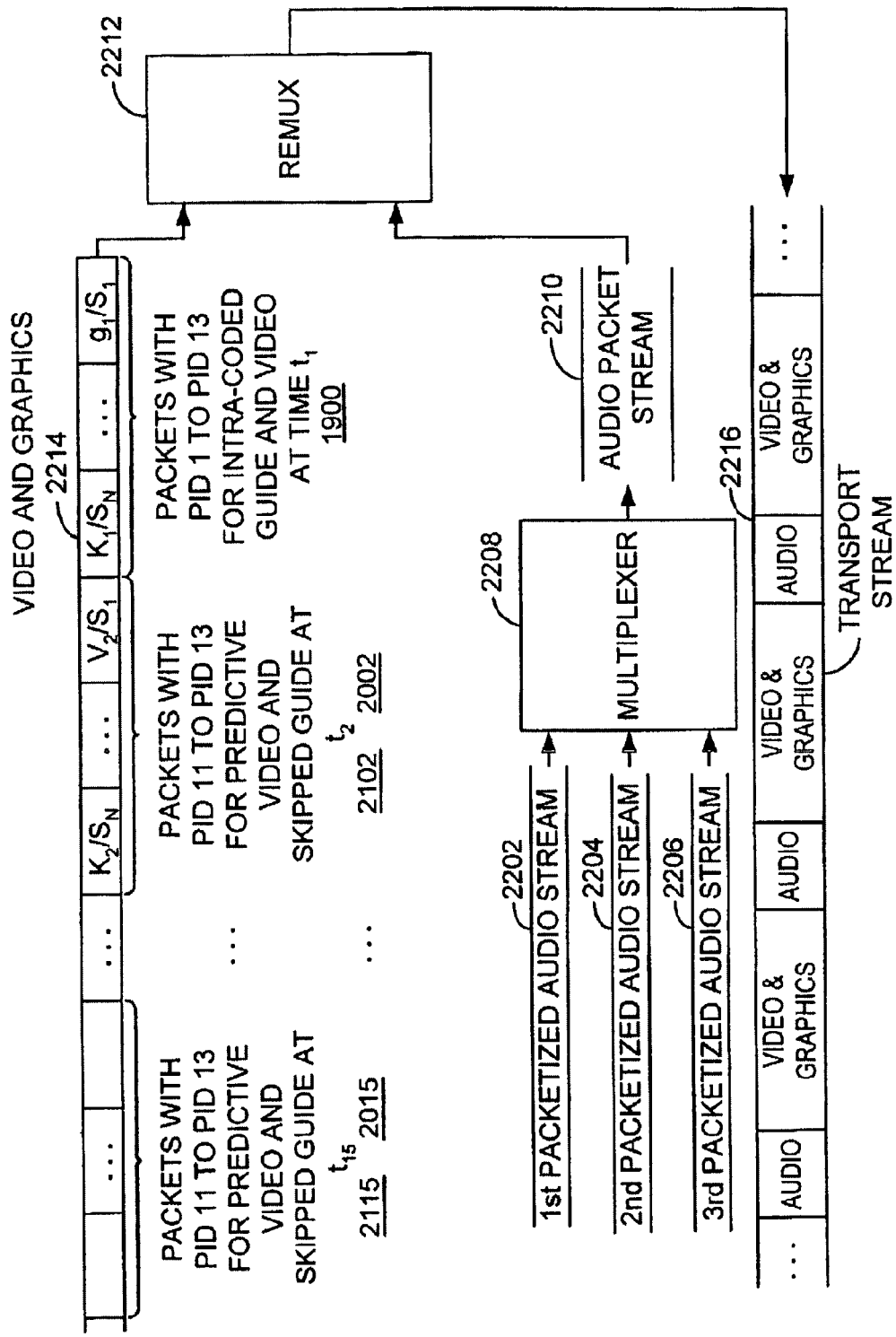
FIG. 22 is a block diagram illustrating a system and apparatus for multiplexing various packet streams to generate a transport stream in accordance with an embodiment of this invention.

FIG. 22 is a block diagram illustrating a system and apparatus for multiplexing various packet streams to generate a transport stream in accordance with an embodiment of this invention. The apparatus shown in FIG. 22 may be employed as part of the local neighborhood equipment (LNE) 228 of the distribution system described above in relation to FIG. 2. In the example illustrated in FIG. 22, the various packet streams include three packetized audio streams 2202, 2204, and 2206, and the video and graphic packet stream 2214 comprising the intra-coded 1900, predictive-coded 2000, and skipped-coded 2100 packets.

The three packetized audio streams 2202, 2204, and 2206 are input into a multiplexer 2208. The multiplexer 2208 combines the three streams into a single audio packet stream 2210. The single audio stream 2210 is then input into a remultiplexer 2212. An alternate embodiment of the present invention may input the three streams 2202, 2204, and 2206 directly into the remultiplexer 2212, instead of first creating the single audio stream 2210.

The video and graphic packet stream 2214 is also input into the remultiplexer 2212. As described above in relation to FIGS. 19-21, the video and graphic packet stream 2214 comprises the intra-coded 1900, predictive-coded 2000, and skipped-coded 2100 packets. One way to order the packets for a single GOP is illustrated in FIG. 22. First, the packets 1900 with PID 1 to PID 13 for intra-coded guide and video at time t1 are transmitted. Second, packets 2002 with PID 11 to PID 13 for predictive-coded video at time t2 are transmitted, followed by packets 2102 with PID 11 to PID 13 for skipped-coded guide at time t2. Third, packets 2003 with PID 11 to PID 13 for predictive-coded video at time t3 are transmitted, followed by packets 2103 with PID 11 to PID 13 for skipped-coded guide at time t3. And so on, until lastly for the GOP, packets 2015 with PID 11 to PID 13 for predictive-coded video at time t15 are transmitted, followed by packets 2115 with PID 11 to PID 13 for skipped-coded guide at time t15.

The remultiplexer 2212 combines the video and graphic packet stream 2214 with the audio packet stream 2210 to generate a transport stream 2216. In one embodiment, the transport stream 2216 interleaves the audio packets with video and graphics packets. In particular, the interleaving may be done such that the audio packets for time t1 are next to the video and graphics packets for time t1, the audio packets for time t2 are next to the video and graphics packets for time t2, and so on.

FIG. 23 is a schematic diagram illustrating slice-based partitioning of multiple objects of an exemplary user interface that is presented to the user as an initial screen in accordance with an embodiment of this invention. In the example illustrated in FIG. 23, nine objects O1 through O9 are shown. As illustrated in part (a) on the left side of FIG. 23, these nine objects may be displayed on one full-size video screen by dividing the screen into a 3×3 matrix with nine areas. In this case, each of the nine objects would be displayed at ⅓ of the full horizontal resolution and ⅓ of the full vertical resolution.

Part (b) on the right side of FIG. 23 shows one way for slice-based partitioning of the nine objects being displayed in the 3×3 matrix. The frame in FIG. 23(b) is divided into 3N horizontal slices. Slices 1 to N include objects O1, O2, and O3, dividing each object into N horizontal slices. Slices N+1 to 2N include objects O4, O5, and O6, dividing each object into N horizontal slices. Lastly, slices 2N+1 to 3N include objects O7, O8, and O9, dividing each object into N horizontal slices.

Figure 24:
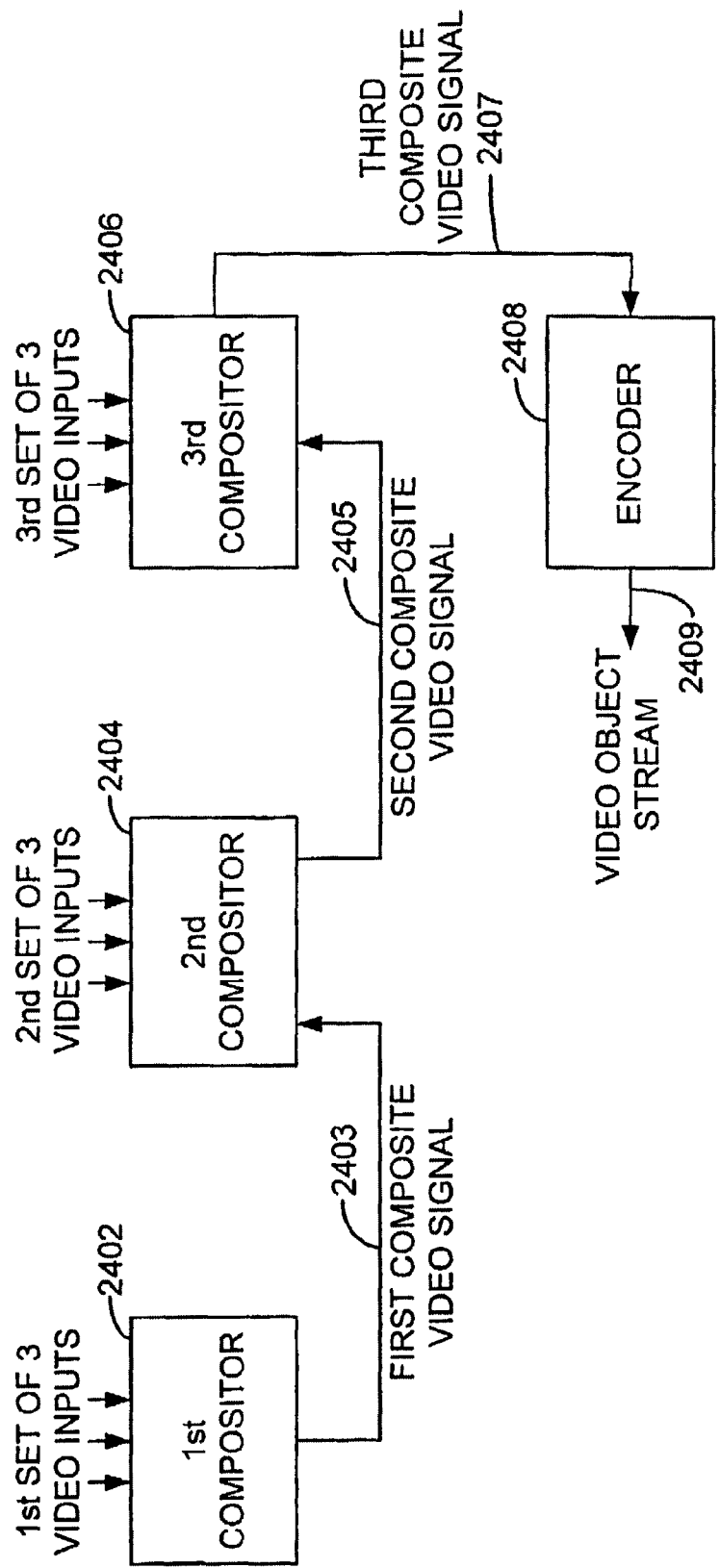
FIG. 24 is a block diagram illustrating a cascade compositor for resizing and combining multiple video inputs to create a single video output which may be encoded into a video object stream in accordance with an embodiment of this invention.

FIG. 24 is a block diagram illustrating a cascade compositor for resizing and combining multiple video inputs to create a single video output which may be encoded into a video object stream in accordance with an embodiment of this invention. In the example shown in FIG. 24, the number of multiple video inputs is nine. In this case, each video input corresponds to a video object from the arrangement shown in FIG. 23(a).

The first compositor 2402 receives a first set of three full-size video inputs which correspond to the first row of video objects O1, O2, and O3 in FIG. 23(a). The first compositor 2402 resizes each video input by one third in each dimension, then arranges the resized video inputs to form the first row of video objects. The first compositor 2402 outputs a first composite video signal 2403 which includes the first row of video objects.

The second compositor 2404 receives the first composite video signal 2403 from the first compositor 2402. The second compositor 2404 also receives a second set of three full-size video inputs which corresponds to the second row of video objects O4, O5, and O6 in FIG. 23(a). The second compositor resizes and arranges these three video inputs. It then adds them to the first composite video signal 2403 to form a second composite video signal 2405 which includes the first and second rows of objects.

The third compositor 2406 receives the second composite video signal 2405 and a third set of three full-size video inputs which corresponds to the third row of video objects O7, O8, and O9 in FIG. 23(a). The third compositor 2406 resizes and arranges these three video inputs. It then adds them to the second composite video signal 2405 to form a third composite video signal 2407 which includes all three rows of objects.

An encoder 2408 receives the third composite video signal 2407 and digitally encodes it to form a video object stream 2409. The encoding may be slice-based encoding using the partitioning shown in FIG. 23(b).

Figure 25:
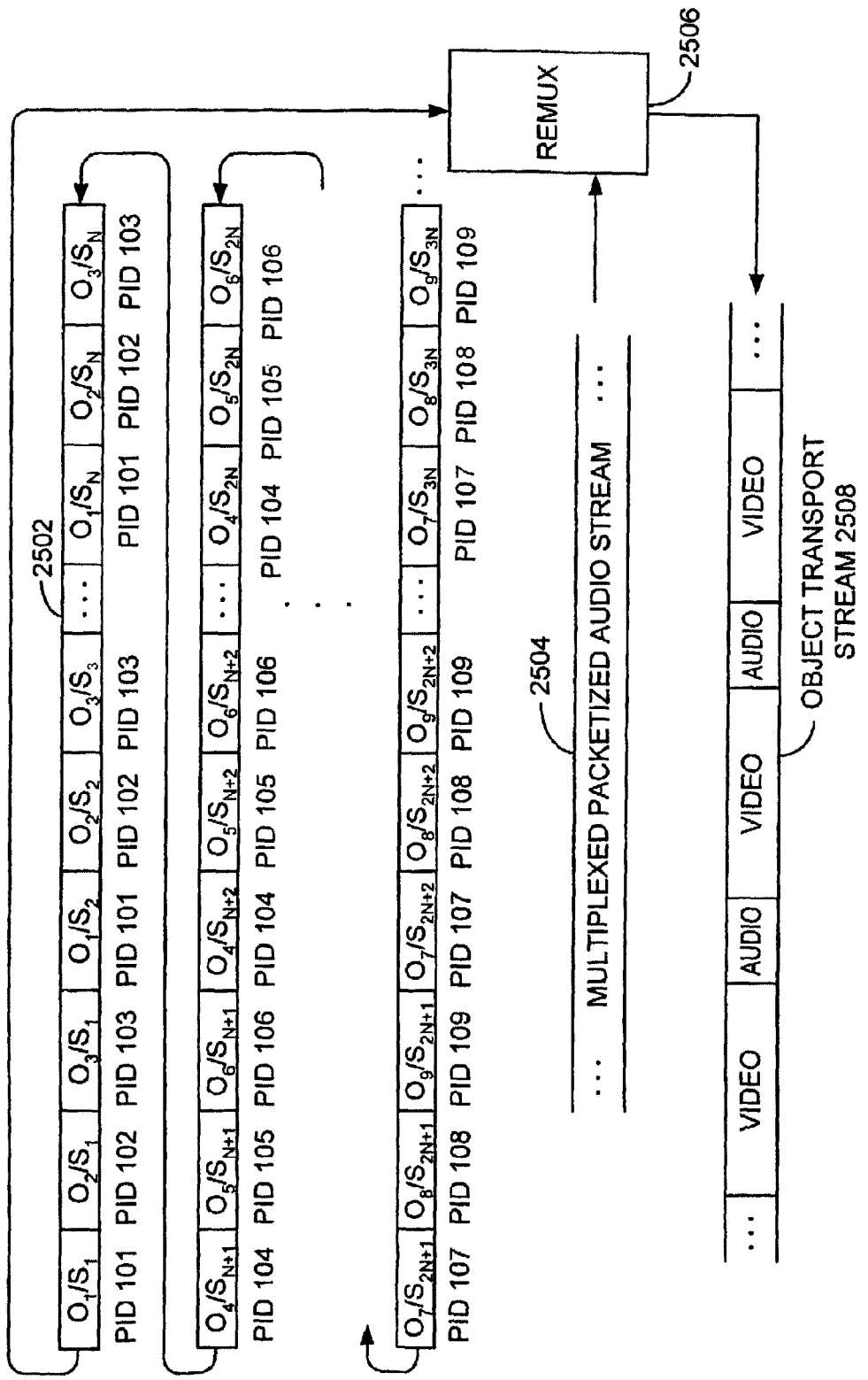
FIG. 25 is a block diagram illustrating a system and apparatus for multiplexing video object and audio streams to generate a transport stream in accordance with an embodiment of this invention.

FIG. 25 is a block diagram illustrating a system and apparatus for multiplexing video object and audio streams to generate a transport stream in accordance with an embodiment of this invention. The apparatus shown in FIG. 25 may be employed as part of the local neighborhood equipment (LNE) 228 of the distribution system described above in relation to FIG. 2. In the example illustrated in FIG. 25, the various packet streams include a video object stream 2502 and a multiplexed packetized audio stream 2504.

The multiplexed packetized audio stream 2504 includes multiple audio streams which are multiplexed together. Each audio stream may belong to a corresponding video object. The multiplexed packetized audio stream 2504 is input into a remultiplexer (remux) 2506.

The video object stream 2502 is also input into the remultiplexer 2506. The encoding of the video object stream 2502 may be slice-based encoding using the partitioning shown in FIG. 23(b). In this case, each object is assigned a corresponding packet identifier (PID). For example, the first object O1 is assigned PID 101, the second object O2 is assigned PID 102, the third object O3 is assigned PID 103, and so on, and the ninth object O9 is assigned PID 109.

The remultiplexer 2506 combines the video object stream 2502 with the multiplexed packetized audio stream 2504 to generate an object transport stream 2508. In one embodiment, the object transport stream 2508 interleaves the audio packets with video object packets. In particular, the interleaving may be done such that the audio packets for time t1 are next to the video object packets for time t1, the audio packets for time t2 are next to the video object packets for time t2, and so on.

Figure 26:
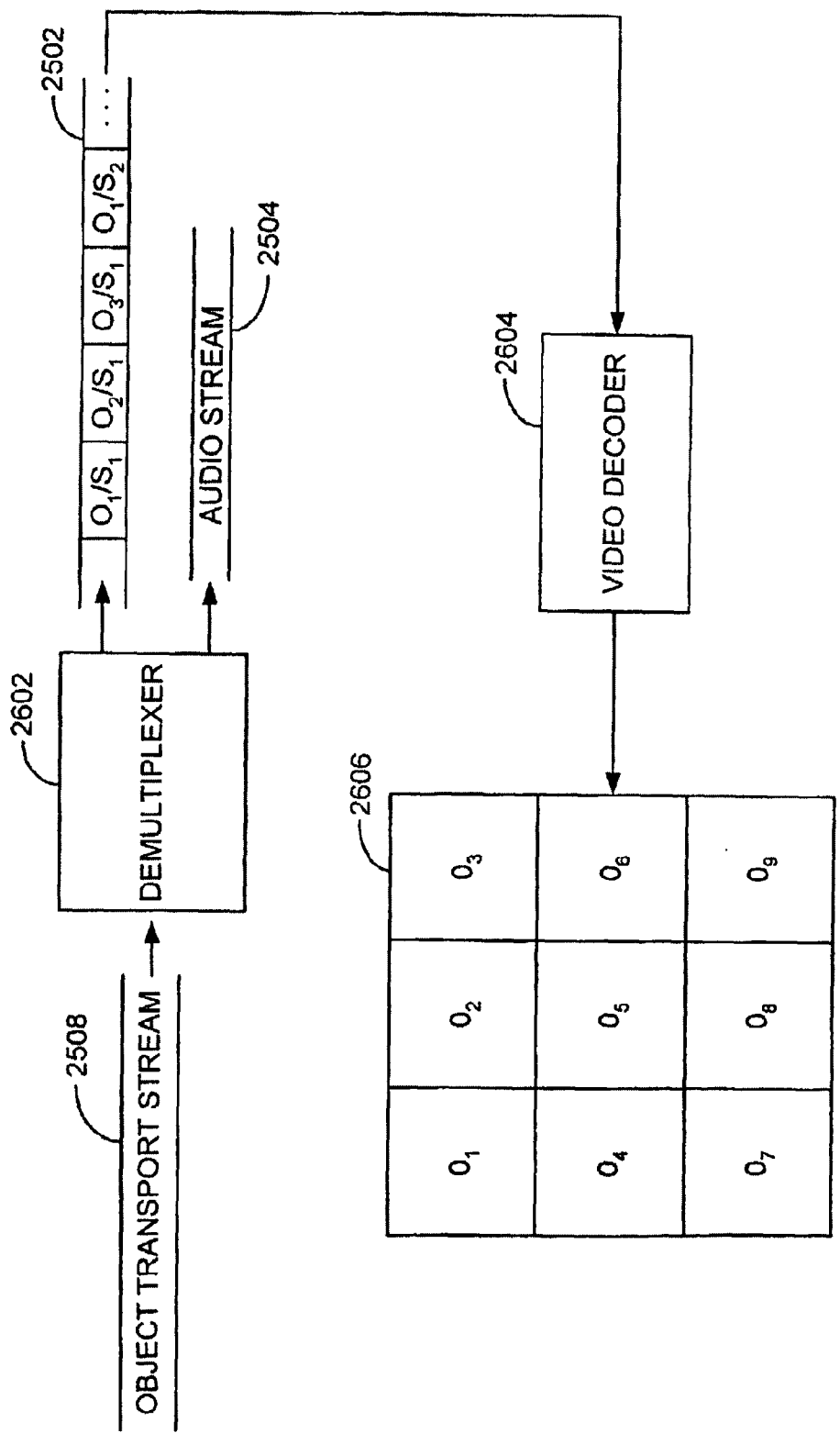
FIG. 26 is a block diagram illustrating a system and apparatus for demultiplexing a transport stream to regenerate video object and audio streams for subsequent decoding in accordance with an embodiment of this invention.

FIG. 26 is a block diagram illustrating a system and apparatus for demultiplexing a transport stream to regenerate video object and audio streams for subsequent decoding in accordance with an embodiment of this invention. The system and apparatus includes a demultiplexer 2602 and a video decoder 2604.

The demultiplexer 2602 receives the object transport stream 2508 and demultiplexes the stream 2508 to separate out the video object stream 2502 and the multiplexed packetized audio stream 2504. The video object stream 2502 is further processed by the video decoder 2604. For example, as illustrated in FIG. 26, the video decoder 2604 may output a video object page 2606 which displays reduced-size versions of the nine video objects O1 through O9.

Figure 27:
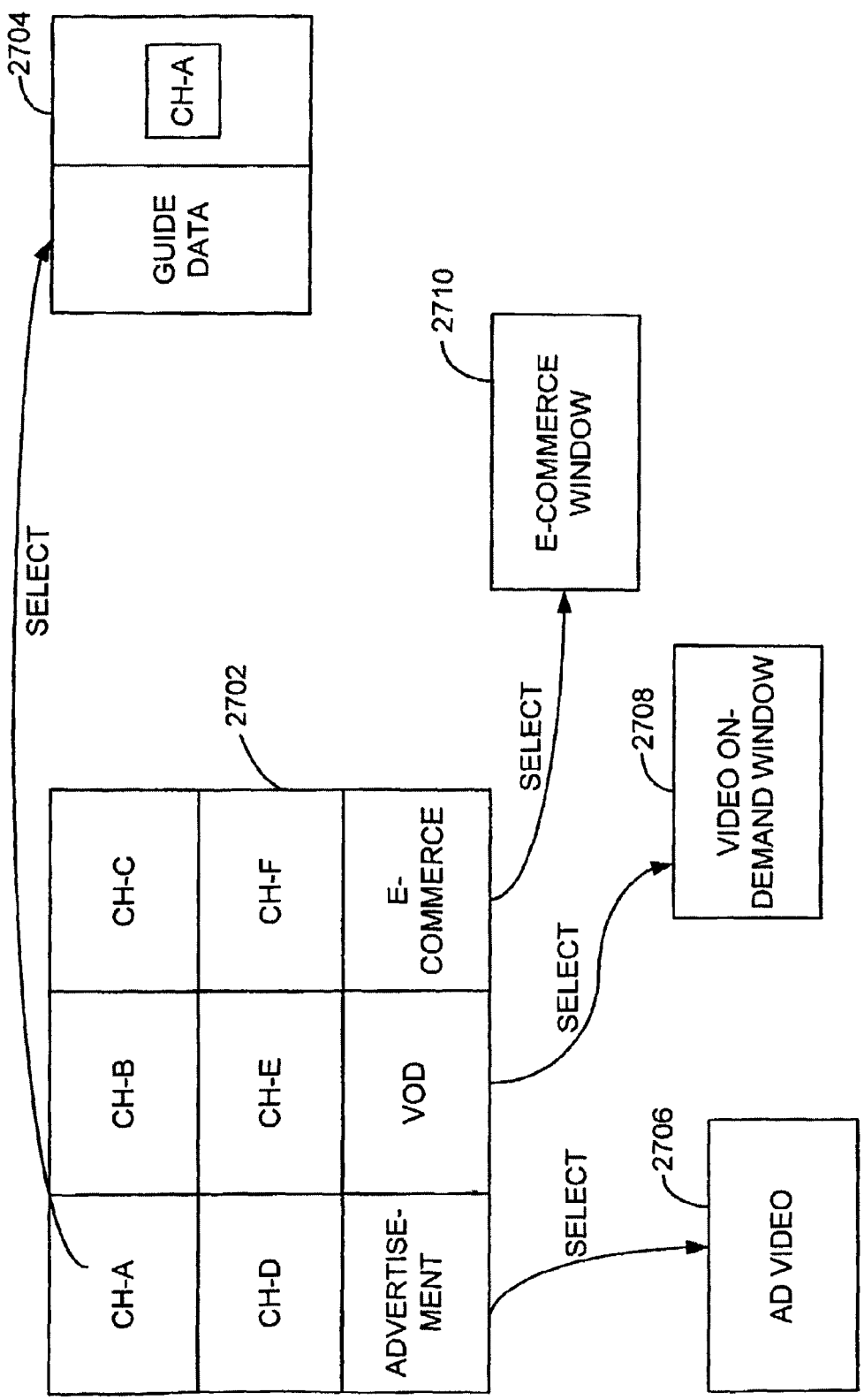
FIG. 27 is a schematic diagram illustrating interacting with objects by selecting them to activate a program guide, an electronic commerce window, a video on-demand window, or an advertisement video in accordance with an embodiment of this invention.

FIG. 27 is a schematic diagram illustrating interaction with objects by selecting them to activate a program guide, an electronic commerce window, a video on-demand window, or an advertisement video in accordance with an embodiment of this invention. In the example illustrated in FIG. 27, a video display 2702 may display various objects, including multiple video channel objects (Channels A through F, for example), an advertisement object, a video on-demand (VOD) object, and an electronic commerce (e-commerce) object.

Each of the displayed objects may be selected by a user interacting with a set-top terminal. For example, if the user selects the channel A object, then the display may change to show a relevant interactive program guide (IPG) page 2704. The relevant IPG page 2704 may include, for example, a reduced-size version of the current broadcast on channel A and guide data with upcoming programming for channel A or the guide page where channel A is located. The audio may also change to the audio stream corresponding to channel A.

As another example, if the user selects the advertisement object, then the display may change to show a related advertisement video (ad video) 2706. Further, this advertisement video may be selected, leading to an electronic commerce page relating to the advertisement. The audio may also change to an audio stream corresponding to the advertisement video.

As yet another example, if the user selects the VOD object, then the display may change to show a VOD window 2708 which enables and facilitates selection of VOD content by the user. Further, once the user selects a particular video for on-demand display, an electronic commerce page may be displayed to make the transaction between the user and the VOD provider.

As yet another example, if the user selects the electronic commerce (e-commerce) object, then the display may change to show an e-commerce window 2710 which enables and facilitates electronic commerce. For example, the e-commerce window 2710 may comprise a hypertext markup language (HTML) page including various multimedia content and hyperlinks. The hyperlinks may, for example, link to content on the world wide web, or link to additional HTML pages which provides further product information or opportunities to make transactions.

Figure 28:
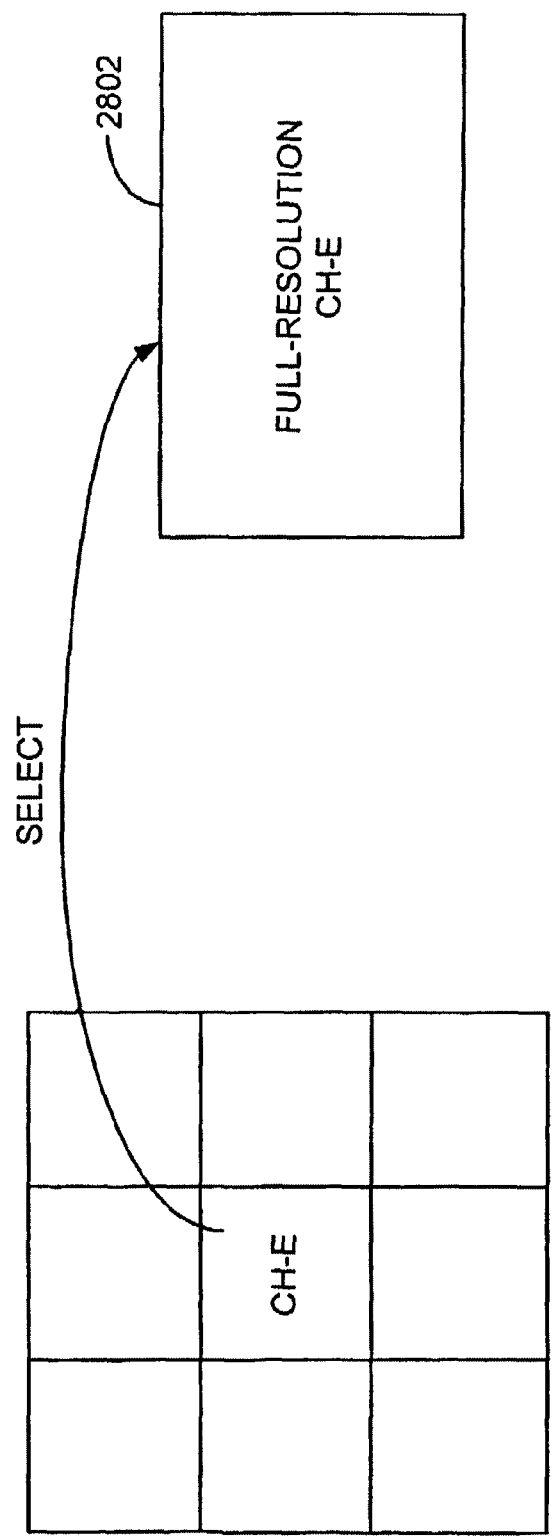
FIG. 28 is a schematic diagram illustrating interacting with an object by selecting it to activate a full-resolution broadcast channel in accordance with an embodiment of this invention.

FIG. 28 is a schematic diagram illustrating interacting with an object by selecting it to activate a full-resolution broadcast channel in accordance with an embodiment of this invention. In this example, if the user selects the object for channel E, the display changes to a full-resolution display 2802 of the video broadcast for channel E, and the audio changes to the corresponding audio stream. The same principle applies when the channel is pointcast to a specific viewer.

Figure 29:
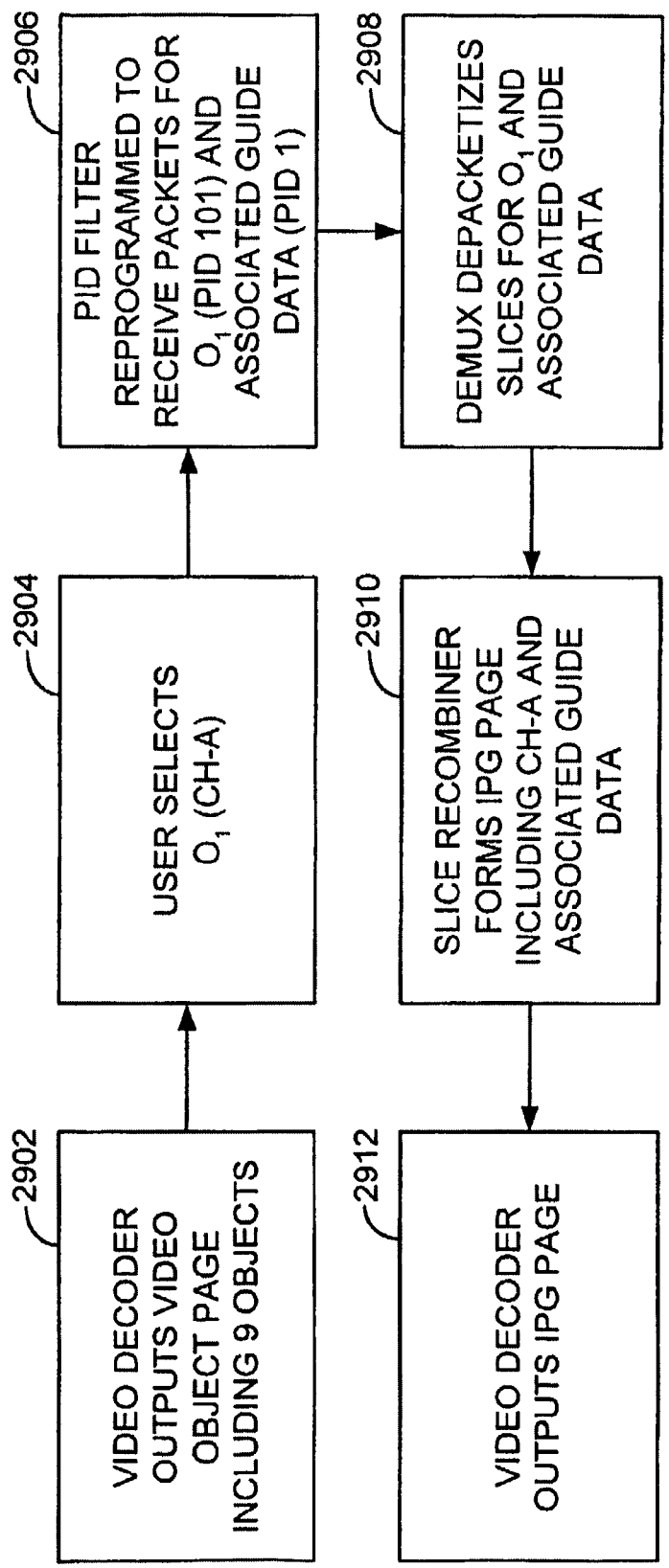
FIG. 29 is a flow chart illustrating an object selection operation in accordance with an embodiment of this invention.

FIG. 29 is an exemplary flow chart illustrating an object selection operation in accordance with an embodiment of this invention. While in the receiving operation, the PID filter is employed as an example to fulfill the PID selection operation, any of the preferred filtering and demultiplexing methods discussed in FIGS. 15, 16, 17, and 18 can be utilized. The exemplary operation includes the following steps:

In a first step 2902, the video decoder 2604 (decodes and) outputs the video object page 2606 which includes the nine objects O1 through O9. In a second step 2904, a user selects an object via a set top terminal or remote control. For example, the object may be the first object O1 which may correspond to channel A. In this example, selection of the first object O1 results in the display on a corresponding IPG page 2704 including guide data and a reduced-size version of the channel A broadcast.

In a third step 2906, a PID filter is reprogrammed to receive packets for O1 and associated guide data. For example, if packets for video object O1 are identified by PID 101, and packets for the associated guide data are identified by PID 1, then the PID filter would be reprogrammed to receive packets with PID 101 and PID 1. This filtering step 2906 is described further below in relation to FIG. 30. Such reprogramming of the PID filter would occur only if such a PID filter. One system and method using such a PID filter is described above in relation to FIG. 17. The methods in FIGS. 15, 16, or 18 can be employed depending on the receiving terminal capabilities and requirements.

In a fourth step 2908, a demultiplexer (Demux) depacketizes slices of the first object O1 and associated guide data. Note that this step 2908 and the previous step 2906 are combined in some of the related methods of FIGS. 15, 16, and 18. Subsequently, in a fifth step 2910, a slice recombiner reconstitutes the IPG page including the reduced-size version of the channel A broadcast and the associated guide data. Slices would only be present if the first object O1 and associated guide data were encoded using a slice-based partitioning technique, such as the one described above in relation to FIG. 23(*b*).

Finally, in a sixth step 2912, a video decoder decodes and outputs the IPG page for viewing by the user.

Figure 30:
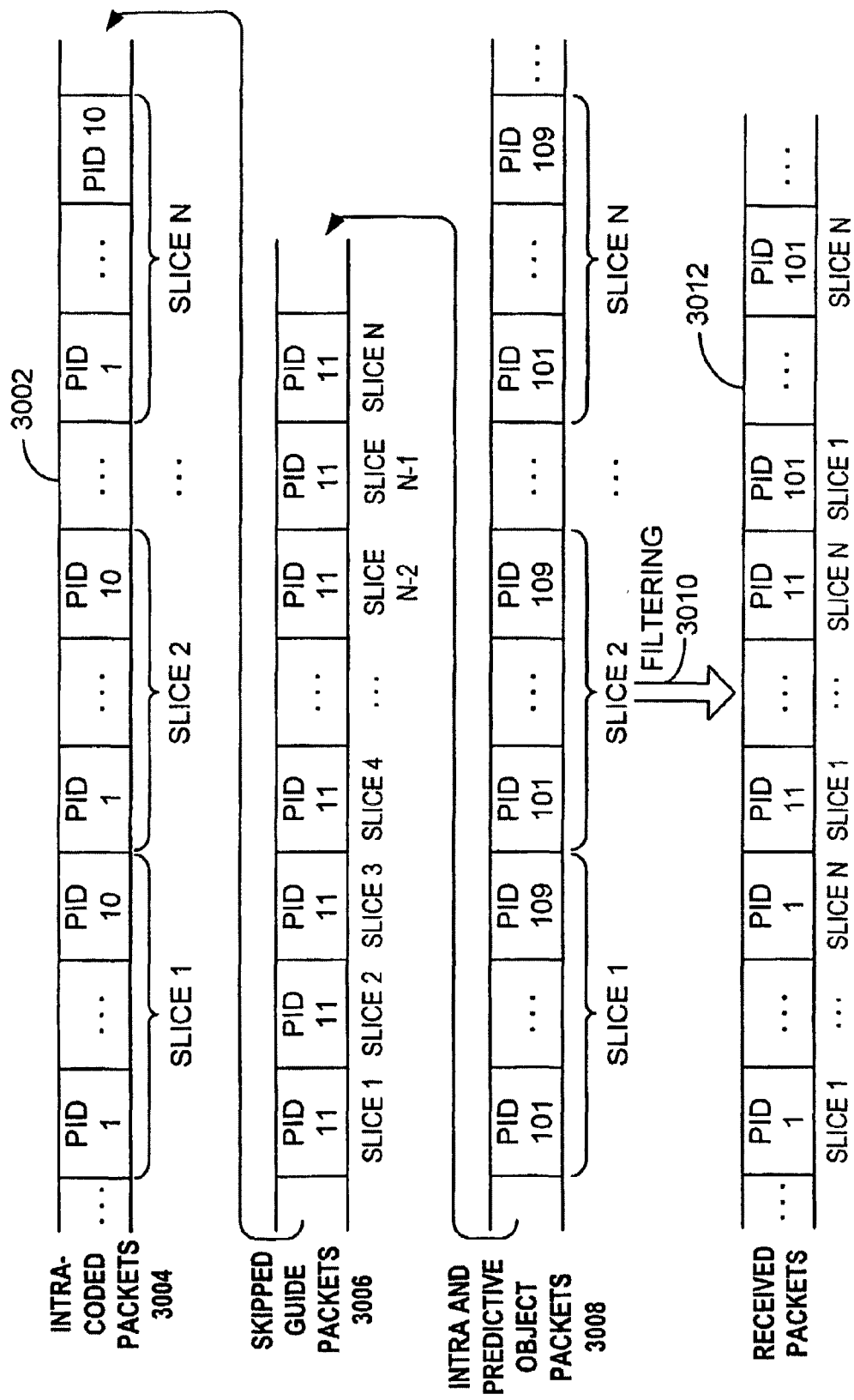
FIG. 30 is a schematic diagram illustrating PID filtering prior to slice recombination in accordance with an embodiment of this invention.

FIG. 30 is a schematic diagram illustrating PID filtering prior to slice recombination in accordance with an embodiment of this invention. FIG. 30 shows an example of a transport stream 3002 received by a set top terminal. The transport stream 3002 includes intra-coded guide packets 3004, predictive-coded (skipped) guide packets 3006, and intra-coded and predictive-coded video object packets 3008.

In the example illustrated in FIG. 30, the intra-coded guide packets 3004 include slice-partitioned guide graphics data for the first frame of each group of pictures (GOP) for each of ten IPG pages. These intra-coded packets 3004 may, for example, be identified by PID 1 through PID 10 as described above in relation to FIG. 19.

Similarly, the skipped-coded guide packets 3006 include skipped-coded data for the second through last frames of each GOP for each of ten IPG pages. These skipped-coded packets 3006 may be identified, for example, by PID 11 as described above in relation to FIG. 21.

In the example illustrated in FIG. 30, the intra-coded and predictive-coded video object packets 3008 include slice-partitioned video data for each of nine objects O1 through O9. These packets 3008 may, for example, be identified by PID 101 through PID 109 as described above in relation to FIG. 25.

The transport stream 3002 is filtered 3010 by a PID filter. The filtering process 3010 results in received packets 3012. For example, if the PID filter is programmed to receive only packets corresponding to the first object O1 (PID 101) and associated guide data (PIDs 1 and 11), then the received packets 3012 would include only those packets with PIDs 101, 1, and 11.

Figure 31:
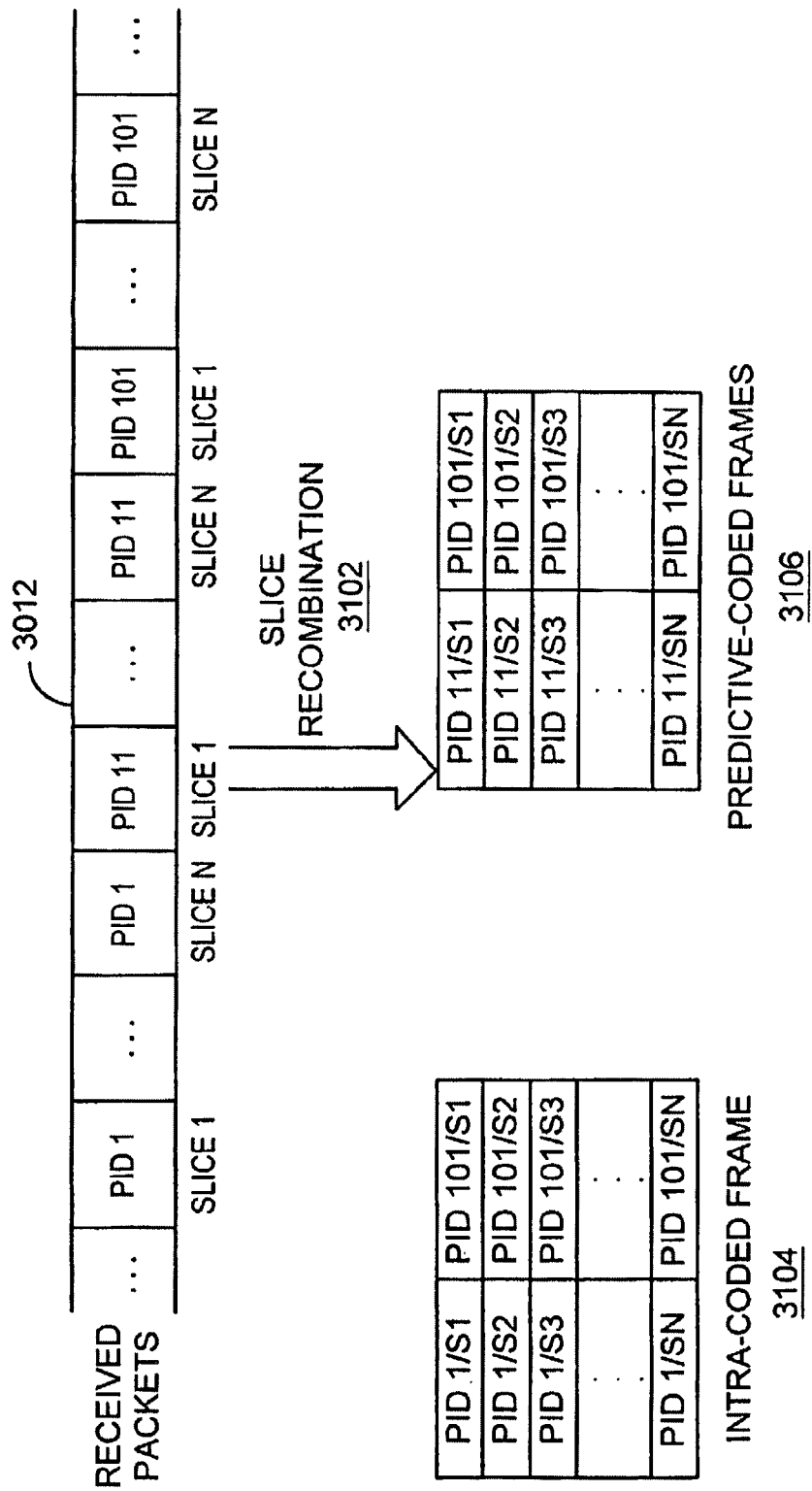
FIG. 31 is a schematic diagram illustrating slice recombination in accordance with an embodiment of this invention.

FIG. 31 is a schematic diagram illustrating slice recombination in accordance with an embodiment of this invention. In this embodiment, slice recombination occurs after PID filtering. A slice recombiner receives the PID-filtered packets 3012 and performs the slice recombination process 3102 in which slices are combined to form frames. As a result of the slice recombination process 3102, an intra-coded frame 3104 is formed for each GOP from the slices of the intra-coded guide page (PID 1) and the slices of the intra-coded video frame (PID 101). Furthermore, the second to last predictive-coded frames 3106 are formed for each GOP from the slices of the skipped-coded guide page (PID 11) and the slices of the predictive-coded video frames (PID 101). The above discussed methods can be equally applied to frame-based encoding and delivery by defining a slice as a complete frame without loss of generality.

The above discussed encoding and delivery methods for PIP utilizes a combination of broadcast/demandcast traffic model where multiple video signals are broadcast and delivered to the set top box even the viewer does not utilize some of the video content at a particular time. Such an approach makes response times far more consistent, and far less sensitive to the number of subscribers served. Typical latencies may remain sub-second even when the subscriber count in a single modulation group (aggregation of nodes) exceeds 10 thousand. On the other hand, the bandwidth necessary to delivery the content increases compared to a point-to-point traffic model. However, with the advantage of the slice-based recombinant MPEG compression techniques, the latency reduction of broadcast/demandcast model is achieved without much bandwidth compromise.

In addition, with a server-centric content generation and control, the transport streams containing tremendous motion video information is delivered and decoded directly through the transport demultiplexer and MPEG decoder without being accessible to the microprocesssor, saving processing and memory resources and costs at set top terminal.

The multi-functional user interface supports any combination of full-motion video windows, at least one or more of these video inputs can be driven from existing ad-insertion equipment enabling the operator to leverage existing equipment and infrastructure, including ad traffic and billing systems, to quickly realize added revenues. The discussed system does not have any new requirements for ad production. The ads can be the same as are inserted into any other broadcast channels.

H. General Head-End Centric System Architecture for Encoding and Delivery of Combined Realtime and Non-Realtime Content A unique feature of the head-end centric system discussed in previous sections (for encoding and delivery of interactive program guide, multi-functional user interfaces, picture-in-picture type of applications) is the combined processing of realtime and non-realtime multimedia content. In other words, the discussed head-end centric system architecture can be utilized for other related applications that contain realtime and non-realtime content in similar ways with the teachings of this invention. For further clarification, FIG. 32 illustrates a general system and apparatus for encoding, multiplexing, and delivery of realtime and non-realtime content in accordance with the present invention including: a non-realtime content source for providing non-realtime content; a non-realtime encoder for encoding the non-realtime content into encoded non-realtime content; a realtime content source for providing realtime video and audio content; a realtime encoder for encoding the realtime video and audio content into encoded realtime video and audio; a remultiplexer for repacketizing the encoded non-realtime content and the encoded realtime video and audio into transport packets; and a re-timestamp unit coupled to the remultiplexer for providing timestamps to be applied to the transport packets in order to synchronize the realtime and non-realtime content therein.

Figure 32:
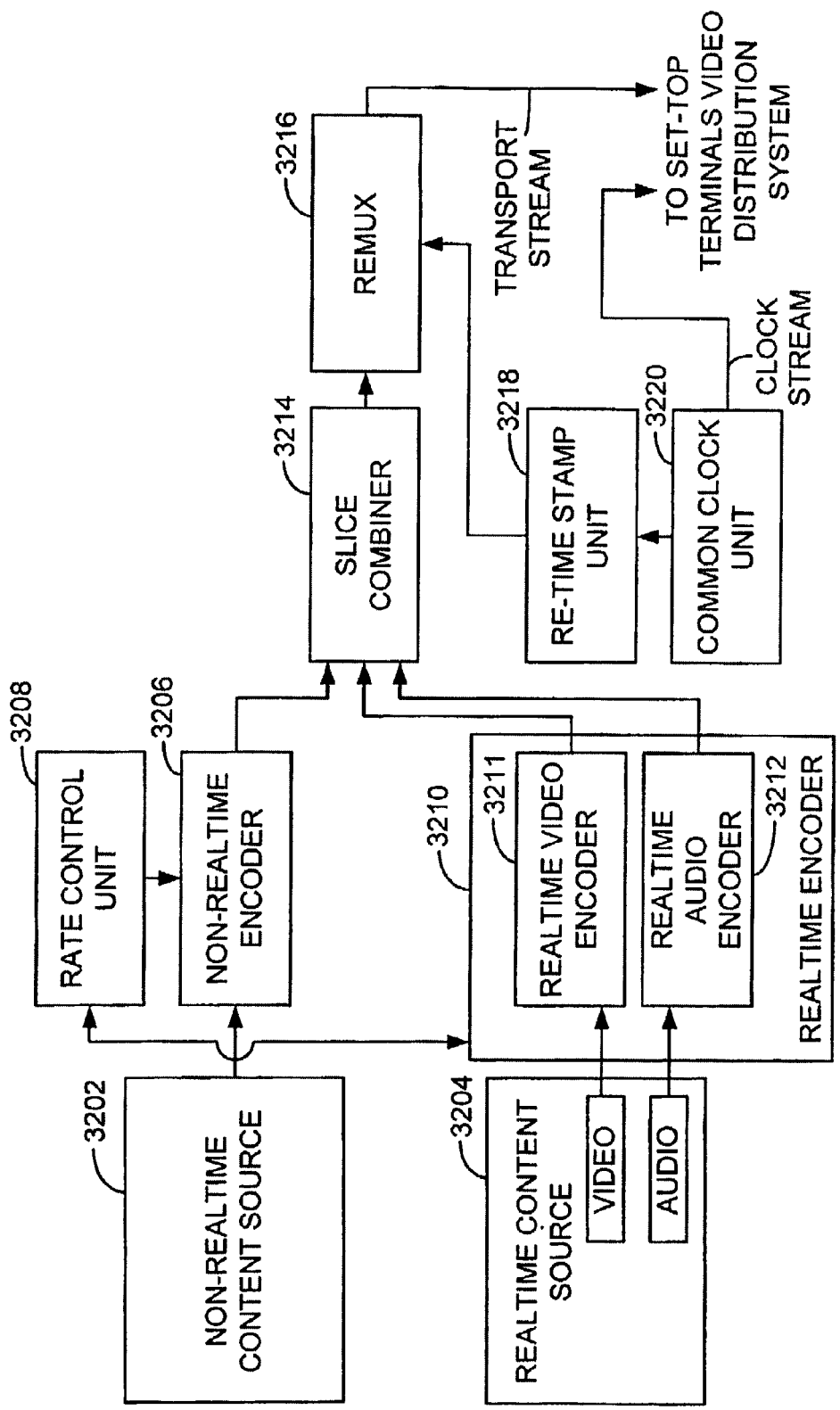
FIG. 32 is a block diagram illustrating a general head-end centric system to encode and deliver a combined real time and non-real time multimedia content.

FIG. 32 is a block diagram illustrating such a system for re-timestamping and rate control of realtime and non-realtime encoded content in accordance with an embodiment of the present invention.

The apparatus includes a non-realtime content source 3202, a realtime content source, a non-realtime encoder 3206, a rate control unit 3208, a realtime encoder 3210 (including a realtime video encoder 3211 and a realtime audio encoder 3212), a slice combiner 3214, a remultiplexer 3216, a re-timestamp unit 3218, and a clock unit 3220.

In a preferred embodiment of the present invention, the apparatus shown in FIG. 32 are included in a head-end of a cable distribution system.

In a preferred embodiment, the non-realtime content includes guide page graphics content for an interactive program guide (IPG), and the realtime content includes video and audio advertisement content for insertion into the IPG.

In a preferred embodiment, the rate control unit 3208 implements an algorithm which sets the bit rate for the output of the non-realtime encoder 3206. Based on a desired total bit rate, the algorithm may substract out a maximum bit rate anticipated for the realtime video and audio encoded signals. The resultant difference would basically give the allowed bit rate for the output of the non-realtime encoder 106. In a slice-based embodiment, this allowed bit rate would be divided by the number of slices to determine the allowed bit rate per slice of the IPG content. In a page-based embodiment, this allowed bit rate would be the allowed bit rate per page of the IPG content.

In a preferred embodiment, the re-timestamp unit 3218 receives a common clock signal from the common clock unit 3220 and generates therefrom presentation and decoding timestamps. These timestamps are transferred to the remultiplexer (Remux) 3216 for use in re-timestamping the packets (overriding existing timestamps from the encoders 3206, 3211, and 3212). The re-timestamping synchronizes the non-realtime and realtime content so that non-realtime and realtime content intended to be displayed in a single frame are displayed at the same time.

In a preferred embodiment, the common clock unit 3220 also provides a common clock stream to the set-top terminals. The common clock stream is transmitted in parallel with the transport stream.

What is claimed is:

1. An apparatus, comprising:
a demultiplexer configured to extract from a transport stream a first elementary stream including a first set of encoded guide slices representing a guide region of a first program guide page of a plurality of program guide pages, a second elementary stream including a second set of encoded guide slices representing a guide region of a second program guide page of the plurality of program guide pages, and a third elementary stream including a first set of encoded video slices representing a first video region common to each of the plurality of program guide pages;
a decoder configured, in response to a selection of the first program guide page, to combine the first set of encoded guide slices and the first set of encoded video slices into a single encoded video stream, and decode the single encoded video stream to produce image representative data of said first program guide page; and a processor configured to generate a presentation signal including said image representative data of said first program guide page.

2. The apparatus of claim 1, wherein the first elementary stream includes a first packet identifier, the second elementary stream includes a second packet identifier, and the third elementary stream includes a third packet identifier.

3. A method comprising:
dividing a program guide that lists available content arranged as a grid into a plurality of grid regions, the available content arranged according to time and channel parameters;
encoding a first grid region of said plurality of grid regions into a first set of guide slices;
encoding a second grid region of said plurality of grid regions into a second set of guide slices;
encoding a first video into a first set of video slices; and
transmitting said first and second sets of guide slices and said first set of video slices to a terminal, wherein said first and second sets of guide slices and said first set of video slices are encoded such that said first set of guide slices and said first set of video slices are configured to be combined into a single encoded video stream , which is configured to be decoded into a first program guide page, and said second set of guide slices and said first set of video slices are configured to be combined into a different single encoded video stream, which is configured to be decoded into a second program guide page.

4. The method of claim 3, wherein:
each of said first and second sets of guide slices and said first set of video slices are transmitted as separate elementary streams each having a unique packet identifier.

5. The method of claim 4, further comprising:
selecting the unique packet identifiers for each of said elementary streams in a manner enabling navigation of said program guide pages using packet identifier indexing.

6. The method of claim 4, wherein said elementary streams are transported to the terminal via a common transport stream.

7. The method of claim 3, further comprising:
receiving a program guide selection signal from the terminal;
identifying a portion of the available content associated with the selection signal; and
providing control information to said terminal, which enables the selection by said terminal of a bitstream including the portion of available content.

8. The method of claim 7, further comprising:
opening a session with said terminal;
establishing a content communications channel; and
transmitting said portion of the available content via said content communications channel.

9. A method, comprising:
receiving a first set of encoded guide slices representing a first portion of a program guide that lists available content arranged as a grid according to time and channel parameters, the first set of encoded guide slices formatted for a first program guide page of a plurality of program guide pages;
receiving a second set of encoded guide slices representing a second portion of the program guide, the second set of encoded guide slices formatted for a second program guide page of the plurality of program guide pages;
receiving a first set of encoded video slices representing a first video;

receiving a selection of the first program guide page;
in response to the selection, combining the first set of encoded guide slices and the first set of encoded video slices into a single encoded video stream, and decoding the single encoded video stream to produce image representative data of said first program guide page; and
generating a presentation signal including said image representative data of said first program guide page.

10. The method of claim 9, further comprising:
extracting, from a first bitstream, the first set of encoded guide slices;
extracting, from a second bitstream, the first set of encoded video slices, wherein each of the bitstreams is assigned a different packet identifier.

11. The method of claim 10, wherein said bitstreams are selected for extracting according to packet identifiers associated with the first program guide page.

12. The method of claim 9, further comprising:
extracting, from a first bitstream, the first set of encoded guide slices and the first set of encoded video slices.

13. The method of claim 9, further comprising:
in response to a selection of the second program guide page:
combining said second set of encoded guide slices and said first set of encoded video slices into a different single encoded video stream, and decoding the different single encoded video stream to produce image representative data of said second program guide page; and
generating a presentation signal including said image representative data of said second program guide page.

14. The method of claim 9, further comprising:
receiving an audio signal associated with said first video; and
outputting said audio signal contemporaneously with said presentation signal.

15. The method of claim 9, wherein:
each of the first and second sets of encoded guide slices and the first set of video slices is included within a different respective elementary stream; and
the different respective elementary streams are included within a common transport stream.

16. The method of claim 9, wherein:
each of the first and second sets of encoded guide slices and the first set of encoded video slices is included within a different respective elementary stream; and
each of a plurality of transport streams includes at least one of the different respective elementary streams.

17. An apparatus comprising:
a graphics processor configured to:
divide a program guide that lists available content arranged as a grid into a plurality of grid regions, the available content arranged according to time and channel parameters,
encode a first grid region of said plurality of grid regions into a first set of guide slices, and
encode a second grid region of said plurality of grid regions into a second set of guide slices;
a video processor configured to encode a first video into a first set of video slices; and
a modem configured to transmit said first and second sets of guide slices and said first set of video slices to a terminal, wherein said first and second sets of guide slices and said first set of video slices are encoded such that said first set of guide slices and said first set of video slices are configured to be combined into a single encoded video stream, which is configured to be decoded into a first program guide page, and said second set of guide slices and said first set of video slices are configured to be combined into a different single encoded video stream, which is configured to be decoded into a second program guide page.

18. A system comprising the apparatus of claim 17 and a terminal, the terminal comprising:

a demultiplexer configured to receive the first and second sets of guide slices and said first set of video slices;

a decoder configured, in response to a selection of the first program guide page, to combine the first set of encoded guide slices and the first set of encoded video slices into the single encoded video stream, and decode the single encoded video stream to produce image representative data of said first program guide page; and a processor configured to generate a presentation signal including said image representative data of said first program guide page.

* * * * *